(12) United States Patent
Yamada

(10) Patent No.: US 9,571,987 B2
(45) Date of Patent: Feb. 14, 2017

(54) SEAT MANAGEMENT SYSTEM

(71) Applicant: KYOCERA Document Solutions Inc., Osaka-shi, Osaka (JP)

(72) Inventor: Sumio Yamada, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/977,692

(22) Filed: Dec. 22, 2015

(65) Prior Publication Data
US 2016/0192158 A1 Jun. 30, 2016

(30) Foreign Application Priority Data
Dec. 26, 2014 (JP) ................................. 2014-264057

(51) Int. Cl.
*H04W 4/04* (2009.01)
(52) U.S. Cl.
CPC .................................... *H04W 4/043* (2013.01)
(58) Field of Classification Search
CPC .................................................... H04W 4/043
See application file for complete search history.

(56) References Cited

U.S. PATENT DOCUMENTS

| 2013/0076089 A1* | 3/2013 | Omiya | A47C 7/72 297/217.3 |
| 2015/0051927 A1* | 2/2015 | Dueser | G06Q 50/30 705/5 |
| 2016/0034826 A1* | 2/2016 | Singh | G06Q 10/02 705/5 |

FOREIGN PATENT DOCUMENTS

| JP | 2011-170725 | 9/2011 | |
| JP | 2013-196302 | * 9/2013 | ............. G06Q 10/06 |

\* cited by examiner

*Primary Examiner* — Brandon Miller
(74) *Attorney, Agent, or Firm* — Gerald E. Hespos; Michael J. Porco; Matthew T. Hespos

(57) ABSTRACT

A seat management system includes a moving apparatus capable of wirelessly communicating directly with each of a plurality of terminal devices while autonomously moving, and an information management apparatus. The information management apparatus includes a first storage section storing therein a seat layout chart, a receiving section operable to receive identification information of a user of each of the terminal devices and current position of the moving apparatus, acquired and transmitted by the moving apparatus, a seat specifying section operable, based on layout positions of a plurality of seats indicated in the seat layout chart, and the received current position, to specify one of the seats on which a specific one of the terminal devices as a replier of the identification information is used, and a seat layout chart update section operable to add the identification information to the specified seat in the seat layout chart.

8 Claims, 16 Drawing Sheets

| SEAT IDENTIFICATION INFORMATION SR | LATITUDE, LONGITUDE, ALTITUDE |
|---|---|
| N1 | lat0 , lon0 , alt1  |
| NW1 | lat1 , lon1 , alt1 |
| NW2 | lat2 , lon1 , alt1 |
| NW3 | lat1 , lon2 , alt1 |
| NW4 | lat2 , lon2 , alt1 |
| NE1 | lat1 , lon3 , alt1 |
| NE2 | lat2 , lon3 , alt1 |
| NE3 | lat1 , lon4 , alt1 |
| NE4 | lat2 , lon4 , alt1 |
| SW1 | lat3 , lon1 , alt1 |
| SW2 | lat4 , lon1 , alt1 |
| SW3 | lat3 , lon2 , alt1 |
| SW4 | lat4 , lon2 , alt1 |
| SE1 | lat3 , lon3 , alt1 |
| SE2 | lat4 , lon3 , alt1 |
| SE3 | lat3 , lon4 , alt1 |
| SE4 | lat4 , lon4 , alt1 |

| USER IDENTIFICATION INFORMATION UR | PASSWORD PW | USER INFORMATION UF ||| 
| | | DEPARTMENT INFORMATION UF1 | NAME INFORMATION UF2 | ADDRESS INFORMATION UF3 |
| --- | --- | --- | --- | --- |
| userA | ****** | DIVISION ○ DEPARTMENT ○ | FIRST NAME A SECOND NAME A | userA@xxx.co.jp |
| userB | ****** | DIVISION ○ DEPARTMENT ○ | FIRST NAME B SECOND NAME B | userB@xxx.co.jp |
| userC | ****** | DIVISION △ DEPARTMENT △ | FIRST NAME C SECOND NAME C | userC@xxx.co.jp |
| userD | ****** | DIVISION △ DEPARTMENT △ | FIRST NAME D SECOND NAME D | userD@xxx.co.jp |
| userE | ****** | DIVISION □ DEPARTMENT □ | FIRST NAME E SECOND NAME E | userE@xxx.co.jp |
| userF | ****** | DIVISION □ DEPARTMENT □ | FIRST NAME F SECOND NAME F | userF@xxx.co.jp |
| userG | ****** | DIVISION ● DEPARTMENT ● | FIRST NAME G SECOND NAME G | userG@xxx.co.jp |
| sysuser | ****** | SYSTEM MANAGEMENT | FIRST NAME α SECOND NAME α | sysuser@xxx.co.jp |

FIG. 11

| SEAT IDENTIFICATION INFORMATION SR | LATITUDE, LONGITUDE, ALTITUDE | USER IDENTIFICATION INFORMATION UR | USER INFORMATION UF ||| STATUS INFORMATION ST |
|---|---|---|---|---|---|---|
| | | | DEPARTMENT INFORMATION UF1 | NAME INFORMATION UF2 | ADDRESS INFORMATION UF3 | |
| N1 | lat0 , lon0 , alt1 | | | | | |
| NW1 | lat1 , lon1 , alt1 | userB | DIVISION O DEPARTMENT O | FIRST NAME B SECOND NAME B | userB@xxx.co.jp | SEATED |
| NW2 | lat2 , lon1 , alt1 | userA | DIVISION O DEPARTMENT O | FIRST NAME A SECOND NAME A | userA@xxx.co.jp | UNSEATED |
| NW3 | lat1 , lon2 , alt1 | | | | | |
| NW4 | lat2 , lon2 , alt1 | | | | | |
| NE1 | lat1 , lon3 , alt1 | | | | | |
| NE2 | lat2 , lon3 , alt1 | | | | | |
| NE3 | lat1 , lon4 , alt1 | | | | | |
| NE4 | lat2 , lon4 , alt1 | | | | | |
| SW1 | lat3 , lon1 , alt1 | | | | | |
| SW2 | lat4 , lon1 , alt1 | | | | | |
| SW3 | lat3 , lon2 , alt1 | | | | | |
| SW4 | lat4 , lon2 , alt1 | | | | | |
| SE1 | lat3 , lon3 , alt1 | | | | | |
| SE2 | lat4 , lon3 , alt1 | | | | | |
| SE3 | lat3 , lon4 , alt1 | | | | | |
| SE4 | lat4 , lon4 , alt1 | | | | | |

FIG. 16

| SEAT IDENTIFICATION INFORMATION SR | LATITUDE, LONGITUDE, ALTITUDE | USER IDENTIFICATION INFORMATION UR | USER INFORMATION UF | | | STATUS INFORMATION ST |
|---|---|---|---|---|---|---|
| | | | DEPARTMENT INFORMATION UF1 | NAME INFORMATION UF2 | ADDRESS INFORMATION UF3 | |
| N1 | lat0 , lon0 , alt1 | | | | | |
| NW1 | lat1 , lon1 , alt1 | userB | DIVISION ○ DEPARTMENT ○ | FIRST NAME B SECOND NAME B | userB@xxx.co.jp | SEATED |
| NW2 | lat2 , lon1 , alt1 | userA | DIVISION ○ DEPARTMENT ○ | FIRST NAME A SECOND NAME A | userA@xxx.co.jp | SEATED |
| NW3 | lat1 , lon2 , alt1 | | | | | |
| NW4 | lat2 , lon2 , alt1 | | | | | |
| NE1 | lat1 , lon3 , alt1 | | | | | |
| NE2 | lat2 , lon3 , alt1 | userC | DIVISION △ DEPARTMENT △ | FIRST NAME C SECOND NAME C | userC@xxx.co.jp | SEATED |
| NE3 | lat1 , lon4 , alt1 | userD | DIVISION △ DEPARTMENT △ | FIRST NAME D SECOND NAME D | userD@xxx.co.jp | SEATED |
| NE4 | lat2 , lon4 , alt1 | | | | | |
| SW1 | lat3 , lon1 , alt1 | | | | | |
| SW2 | lat4 , lon1 , alt1 | userE | DIVISION □ DEPARTMENT □ | FIRST NAME E SECOND NAME E | userE@xxx.co.jp | SEATED |
| SW3 | lat3 , lon2 , alt1 | userF | DIVISION □ DEPARTMENT □ | FIRST NAME F SECOND NAME F | userF@xxx.co.jp | SEATED |
| SW4 | lat4 , lon2 , alt1 | | | | | |
| SE1 | lat3 , lon3 , alt1 | userG | DIVISION ● DEPARTMENT ● | FIRST NAME G SECOND NAME G | userG@xxx.co.jp | UNSEATED |
| SE2 | lat4 , lon3 , alt1 | | | | | |
| SE3 | lat3 , lon4 , alt1 | userH | DIVISION ● DEPARTMENT ● | FIRST NAME H SECOND NAME H | userH@xxx.co.jp | UNSEATED |
| SE4 | lat4 , lon4 , alt1 | | | | | |

SEAT MANAGEMENT SYSTEM

CROSS-REFERENCE TO RELATED APPLICATION

This non-provisional application is based on Japanese Patent Application Serial No. 2014-264057 filed in Japan Patent Office on Dec. 26, 2014, the contents of which are hereby incorporated by reference.

TECHNICAL FIELD

The present disclosure relates to a seat management system, and more particularly to a technique of managing a position of a seat in which a user is currently seated.

BACKGROUND ART

Heretofore, there has been known a seat management system configured to prepare a seat layout chart defining an association between respective ones of layout positions of a plurality of seats within a floor of an office, a lecture room or the like and a plurality of terminal devices equipped in the respective seats, and manage a position of a seat of a user based on information acquired from each of the terminal devices and the seat layout chart.

For example, there has been known a seated-status display system configured to visibly display a floor map for figuring out a position of a seat in which a staff is currently seated. In this seated-status display system, a seated-status display server stores therein a floor map defining an association between respective ones of a plurality of ports of a network switch used for each floor and a plurality of seats provided with the respective ports.

The seated-status display server is operable to acquire, from each of the terminal devices equipped in the respective seats, information about its port via the network switch, and acquire information about a staff corresponding to the acquired port information, from a directory server. Then, the seated-status display server is operable to store therein the acquired staff information in association with the seat associated with the port in the floor map. The stored floor map is displayed on a display of each of the terminal devices. This makes it possible to figure out a position of a seat in which a user is currently seated.

It has also been known a technique of preliminarily providing an authentication card reader in each seat, and identify whether or not a user is seated in the seat, depending on whether or not reading of an authentication card is successfully performed by the authentication card reader.

SUMMARY OF INVENTION

A seat management system of the present disclosure comprises a moving apparatus capable of wirelessly communicating directly with each of a plurality of terminal devices used, respectively, on a plurality of seats being present on a floor, while autonomously moving within the floor, and an information management apparatus capable of communicating with the moving apparatus. The moving apparatus includes an information acquisition section, a position acquisition section and an information transmission section. The information acquisition section is operable to transmit a wireless signal requesting a reply of identification information for identifying a user of each of the terminal devices, and acquire the identification information returned from the terminal device. The position acquisition section is operable to acquire a current position of the moving apparatus. The information transmission section is operable, when the identification information is acquired by the information acquisition section, to transmit the acquired identification information, and the current position acquired by the position acquisition section, to the information management apparatus. The information management apparatus includes a first storage section, a receiving section, a seat specifying section and a seat layout chart update section. The first storage section stores therein a seat layout chart indicating respective layout positions of the plurality of seats within the floor. The receiving section is operable to receive the identification information and the current position each transmitted by the information transmission section. The seat specifying section is operable, based on the layout positions of the seats indicated in the seat layout chart, and the current position received by the receiving section, to specify one of the seats on which a specific one of the terminal devices as a replier of the identification information received by the receiving section is used. The seat layout chart update section is operable to add the identification information received by the receiving section to the seat specified by the seat specifying section, in the seat layout chart stored in the first storage section, to thereby update the seat layout chart.

BRIEF DESCRIPTION OF THE DRAWINGS

FIG. 7 is a diagram illustrating one example of information stored in a second storage section.

FIG. 11 is a diagram illustrating one example of updated seat position information stored in the first storage section.

FIG. 16 is a diagram illustrating another example of the updated seat position information stored in the first storage section.

DESCRIPTION OF EMBODIMENTS

Figure 1:
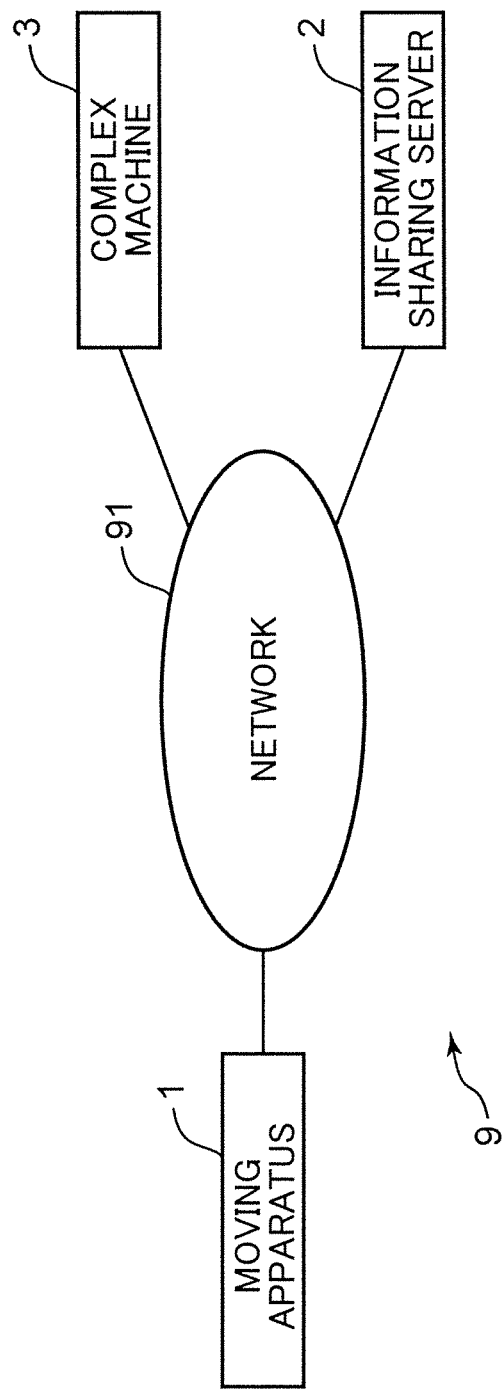
FIG. 1 is an overall configuration diagram of a seat management system according to one embodiment of a seat management system relating to the present disclosure.

Base on the drawings, one embodiment of a seat management system relating to the present disclosure will now be described. FIG. 1 is an overall configuration diagram of a seat management system 9 according to one embodiment of the seat management system relating to the present disclosure.

As illustrated in FIG. 1, the seat management system 9 comprises a moving apparatus 1, an information sharing server 2 (information management apparatus), a complex machine 3 (image forming apparatus), and a network 91 such as LAN (Local Area Network). The moving apparatus 1 is configured to perform wireless communication with the information sharing server 2 via the network 91. The complex machine 3 is configured to perform wired communication with the information sharing server 2 via the network 91.

Respective configurations of the moving apparatus 1, the information sharing server 2 and the complex machine 3 will be described below.

The moving apparatus 1 is autonomously movable in such a manner as to travel within a floor on which a plurality of seats are laid out, while avoiding an obstacle such as a seat.

Figure 2:
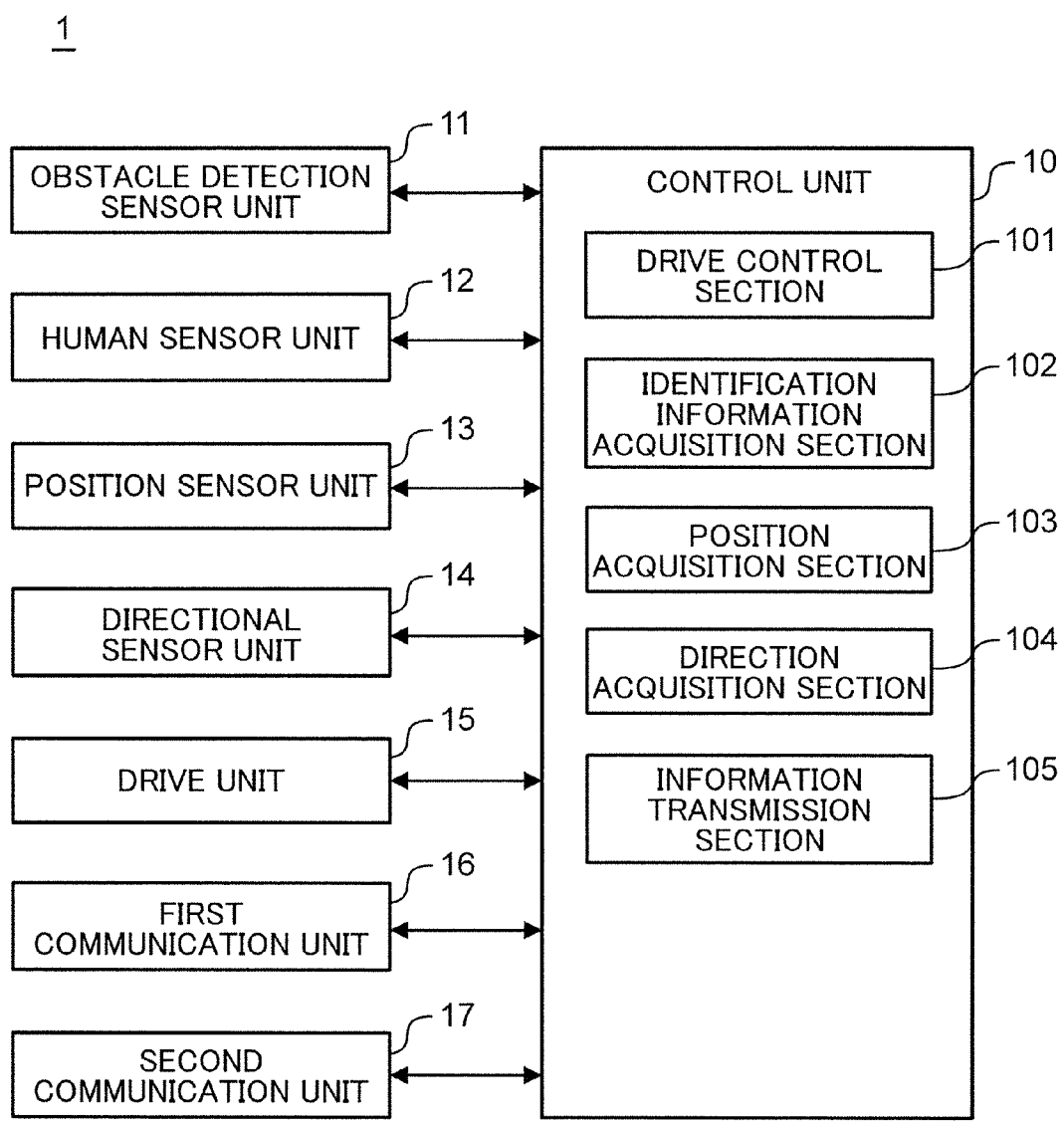
FIG. 2 is a block diagram illustrating an electrical configuration of a moving apparatus according to one embodiment of a moving apparatus relating to the present disclosure.

FIG. 2 is a block diagram illustrating an electrical configuration of the moving apparatus 1 according to one embodiment of a moving apparatus relating to the present disclosure.

Figure 3:
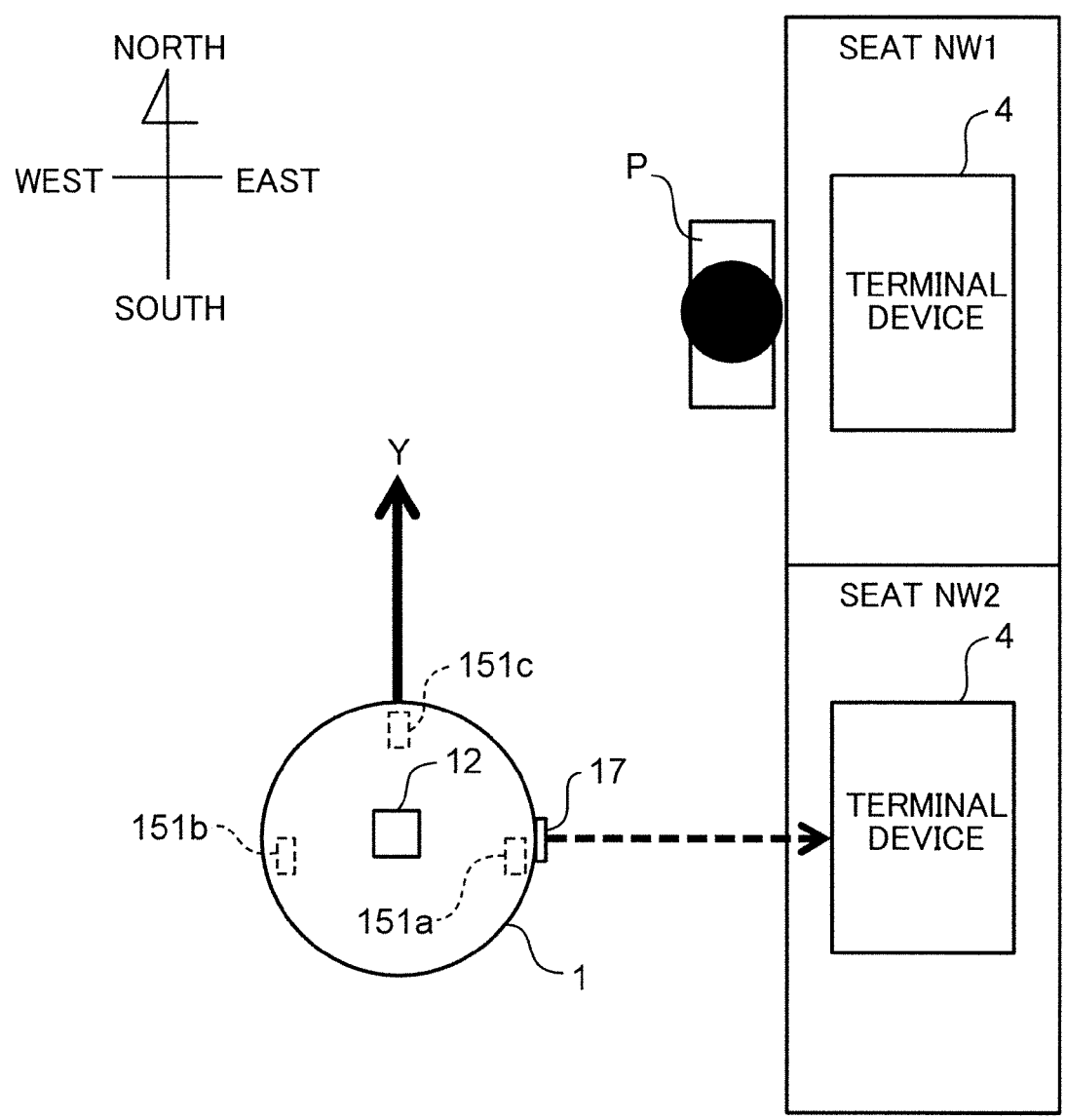
FIG. 3 is an external view of the moving apparatus which is autonomously moving within a floor.

FIG. 3 is an external view of the moving apparatus 1 which is autonomously moving within a floor. Specifically, as illustrated in FIG. 2, the moving apparatus 1 comprises an obstacle detection sensor unit 11, a human sensor unit 12 (person detection unit), a position sensor unit 13, a directional sensor unit 14, a drive unit 15, a first communication unit 16, a second communication unit 17, and a control unit 10.

The obstacle detection sensor unit 11 is configured to detect that the moving apparatus 1 collides with an obstacle. The obstacle detection sensor unit 11 may comprise a piezoelectric element capable of converting vibration into a voltage signal and outputting the voltage signal. In this case, the obstacle detection sensor unit 11 is operable, when a voltage indicated by a voltage signal output from the piezoelectric element is greater than a given reference voltage, to output collision detection information indicative of a collision of the moving apparatus 1 with an obstacle, to output, to the control unit 10.

The human sensor unit 12 is configured to detect whether or not a person is present within a given distance from the moving apparatus 1 and output person detection result information indicative of a result of the detection, to the control unit 10. As illustrated in FIG. 3, the moving apparatus 1 has an apparatus body formed in a columnar shape. The human sensor unit 12 is provided, for example, on an upper surface (surface on a front side of the drawing sheet in FIG. 3) of the apparatus body of the moving apparatus 1. For example, the human sensor unit 12 comprises an infrared sensor capable of detecting infrared rays emitted from a human body and outputting a voltage signal corresponding to an intensity of the detected infrared rays.

In this case, when a voltage indicated by a voltage signal output from the infrared sensor is greater than a given reference voltage, the human sensor unit 12 is operable to detect that a person P is present within the given distance from the moving apparatus 1. Then, the human sensor unit 12 is operable to output, as the person detection result information, information indicative of the presence of a person P, to the control unit 10. On the other hand, when a voltage indicated by a voltage signal output from the infrared sensor is equal to or less than the given reference voltage, the human sensor unit 12 is operable to detect that no person P is present within the given distance from the moving apparatus 1. Then, the human sensor unit 12 is operable to output, as the person detection result information, information indicative of the absence of a person P, to the control unit 10.

The position sensor unit 13 is configured to, under control of the control unit 10, output current position information indicative of a current position of the moving apparatus 1, to the control unit 10. For example, the position sensor unit 13 comprises a GPS (Global Positioning System) receiver. The GPS receiver is capable of calculating latitude, longitude and altitude of the moving apparatus 1, based on radio waves received from a plurality of GPS satellites and correction information received from a fixed reference station on the ground. In this case, the position sensor unit 13 is operable, under control of the control unit 10, to output, as the current position information, latitude, longitude and altitude calculated by the GPS receiver, to the control unit 10.

The directional sensor unit 14 is configured to, under control of the control unit 10, output moving direction information indicative of a moving direction of the moving apparatus 1, to the control unit 10. For example, the directional sensor unit 14 comprises an electronic compass. The electronic compass is equipped with a plurality of magnetic sensors for detecting the geomagnetism. The electronic compass is capable of calculating how much degree the moving direction of the moving apparatus 1 (Y-direction in FIG. 3) inclines in a clockwise direction with respect to true north, based on a geomagnetic intensity detected by the magnetic sensors. In this case, the directional sensor unit 14 is operable to, under control of the control unit 10, output, as the moving direction information indicative of the moving direction of the moving apparatus 1, an angle calculated by electronic compass, to the control unit 10.

For example, when the moving direction of the moving apparatus 1 is oriented to true north, the directional sensor unit 14 is operable to output, as the moving direction information, information indicative of 0°. Further, when the moving direction of the moving apparatus 1 is oriented to true east, the directional sensor unit 14 is operable to output, as the moving direction information, information indicative of 90°. When the moving direction of the moving apparatus 1 is oriented to true south, the directional sensor unit 14 is operable to output, as the moving direction information, information indicative of 180°. When the moving direction of the moving apparatus 1 is oriented to true west, the directional sensor unit 14 is operable to output, as the moving direction information, information indicative of 270°.

As illustrated in FIG. 3, the drive unit 15 comprises two drive wheels 151a, 151b, a driven wheel 151c, and a non-illustrated motor capable of rotationally driving the drive wheels 151a, 151b under control of the control unit 10. The drive wheels 151a, 151b and the driven wheel 151c are provided on a lower surface (surface on a back side of the drawing sheet in FIG. 3) of the moving apparatus 1.

The first communication unit 16 is composed of a wireless LAN communication module, and is configured to perform wireless communication with the information sharing server 2 via the network 91 (FIG. 1).

The second communication unit 17 is composed of a Bluetooth (trade mark) or infrared communication module. On each of the seats within the floor, a terminal device 4 such as a notebook-size personal computer or a tablet is used which comprises the same communication module as that of the second communication unit 17 and is capable of wirelessly communicating directly with the second communication unit 17. The second communication unit 17 is operable to wirelessly communicate directly with each of the terminal devices 4 without intermediacy of the network 91. It should be noted that, a part of the seats within the floor may be provided with a device, such as a file server for each division, incapable of wirelessly communicating directly with the second communication unit 17.

The following description will be made on the assumption that one lateral side of the apparatus body of the moving apparatus 1 provided with the driven wheel 151c is defined as a front side. The second communication unit 17 is installed on a right lateral side of the apparatus body of the moving apparatus 1, to transmit a wireless signal in a direction inclined at 90° clockwisely with respect to the moving direction of the moving apparatus 1. However, an installation position of the second communication unit 17 is not limited thereto. For example, the second communication unit 17 may be installed on a left lateral side of the apparatus body of the moving apparatus 1. In this case, the second communication unit 17 is operable to transmit a wireless signal in a direction inclined at 90° counterclockwisely with respect to the moving direction of the moving apparatus 1.

The control unit 10 is configured to control an operation of each element of the moving apparatus 1. For example, the control unit 10 comprises: a non-illustrated CPU (Central Processing Unit) capable of performing given arithmetic processing; a non-illustrated non-volatile memory such as EEPROM (Electrically Erasable and Programmable Read Only Memory), storing therein a given control program; a non-illustrated RAM (Random Access Memory) for temporarily storing data therein; and peripheral circuits thereof.

The control unit 10 is operable to instruct the CPU to execute the control program stored in the non-volatile memory to thereby operate, for example, as a drive control section 101, an identification information acquisition section 102 (information acquisition section), a position acquisition section 103, a direction acquisition section 104, and an information transmission section 105.

The drive control section 101 is operable to control the drive unit 15 to allow the moving apparatus 1 to autonomously move in such a manner as to travel within the floor while avoiding an obstacle. For example, the drive control section 101 is operable to control the non-illustrated motor of the drive unit 15 to rotationally drive the drive wheels 151a, 151b at the same speed, thereby allowing the moving apparatus 1 to travel in a straight line.

The drive control section 101 is also operable to control the motor to rotationally drive only the drive wheel 151a for a given time to thereby cause the apparatus body of the moving apparatus 1 to turn by a given angle in a counterclockwise direction. Then, the drive control section 101 is operable to control the motor to rotationally drive the drive wheels 151a, 151b at the same speed, thereby allowing the moving apparatus 1 to travel in a straight line. In this way, the drive control section 101 can change the moving direction of the moving apparatus 1 to a direction inclined at the given angle in the counterclockwise direction.

Further, the drive control section 101 is operable to control the motor to rotationally drive only the drive wheel 151b for a given time to thereby cause the apparatus body of the moving apparatus 1 to turn by a given angle in a clockwise direction. Then, the drive control section 101 is operable to control the motor to rotationally drive the drive wheels 151a, 151b at the same speed, thereby allowing the moving apparatus 1 to travel in a straight line. In this way, the drive control section 101 can change the moving direction of the moving apparatus 1 to a direction inclined at the given angle in the clockwise direction.

The drive control section 101 is operable, when the collision detection information output from the obstacle detection sensor unit 11 is input into the control unit 10, to change the moving direction of the moving apparatus 1 to a different direction. For example, the drive control section 101 is operable to instruct the position sensor unit 13 to output the current position information. Then, the drive control section 101 is operable to determine, as the different direction, a direction causing the moving device 1 to come closest to a route preliminarily set to allow the moving device 1 to travel around the entire region within the floor, with respect to the current position indicated by the output current position information. It should be noted that a method for determining the different direction may be different from the above.

The identification information acquisition section 102 is operable, every time a given time elapses, to instruct the second communication unit 17 to transmit a wireless signal requesting a reply of user identification information (identification information) for identifying a user of each of the terminal devices 4. For example, the user identification information is a user ID input into the terminal device 4 by a user when the user logs into the terminal device 4.

Assume that a specific one of the terminal devices 4 capable of wirelessly communicating directly with the second communication unit 17 as mentioned above is present in the transmission direction of the wireless signal. Further, assume that, in response to the wireless signal received from the moving apparatus 1, the specific terminal device 4 returns user identification information. In this case, the identification information acquisition section 102 is operable to acquire the user identification information returned from the specific terminal device 4 and received by the second communication unit 17.

On the other hand, in the case where none of the terminal devices 4 capable of wirelessly communicating directly with the second communication unit 17 as mentioned above is present in the transmission direction of the wireless signal, no user identification information is received by the second communication unit 17, and therefore the identification information acquisition section 102 does not acquire any user identification information.

Differently from the above, assume that, although a specific one of the terminal devices 4 capable of wirelessly communicating directly with the second communication unit 17 as mentioned above is present in the transmission direction of the wireless signal, the specific terminal device 4 is configured to be usable without a login. In this case, no user identification information is input into the specific terminal device, and therefore the specific terminal device does not return any user identification information. Thus, as with the above situation, no user identification information is received by the second communication unit 17, and therefore the identification information acquisition section 102 cannot acquire any user identification information.

The position acquisition section 103 is operable to control the position sensor unit 13 to output therefrom the current position information indicative of the current position of the moving apparatus 1, and acquire the output current position information.

The direction acquisition section 104 is operable, under control of the identification information acquisition section 102, to acquire transmission direction information indicative of the transmission direction of the wireless signal transmitted by the second communication unit 17. More specifically, the direction acquisition section 104 is operable to control the directional sensor unit 14 to output therefrom the moving direction information indicative of the moving direction of the moving apparatus 1, and acquire the output moving direction information. As an example, assume that the second communication unit 17 transmits the wireless signal in a direction inclined at 90° clockwisely with respect to the moving direction of the moving device 1. In this case, the direction acquisition section 104 is operable to add 90° to an angle indicated by the acquired moving direction information, i.e., an angle indicative of the moving direction of the moving apparatus 1, to thereby acquire a result of the addition as the transmission direction information.

The information transmission section 105 is operable, when the user identification information is acquired by the identification information acquisition section 102, to instruct the position acquisition section 103 to acquire the current position information, and instruct the direction acquisition section 104 to acquire the transmission direction information. The information transmission section 105 is also operable, when the user identification information is acquired by the identification information acquisition section 102, to acquire the person detection result information output from the human sensor unit 12.

Then, the information transmission section 105 is operable to instruct the first communication unit 16 to transmit, to the information sharing server 2, the user identification information acquired by the identification information acquisition section 102, the current position information acquired by the position sensor unit 13, the transmission direction information acquired by the direction acquisition section 104, and the person detection result information acquired by the information transmission section 105 itself.

Details of the operation of the moving apparatus 1 will be described later.

Figure 4:
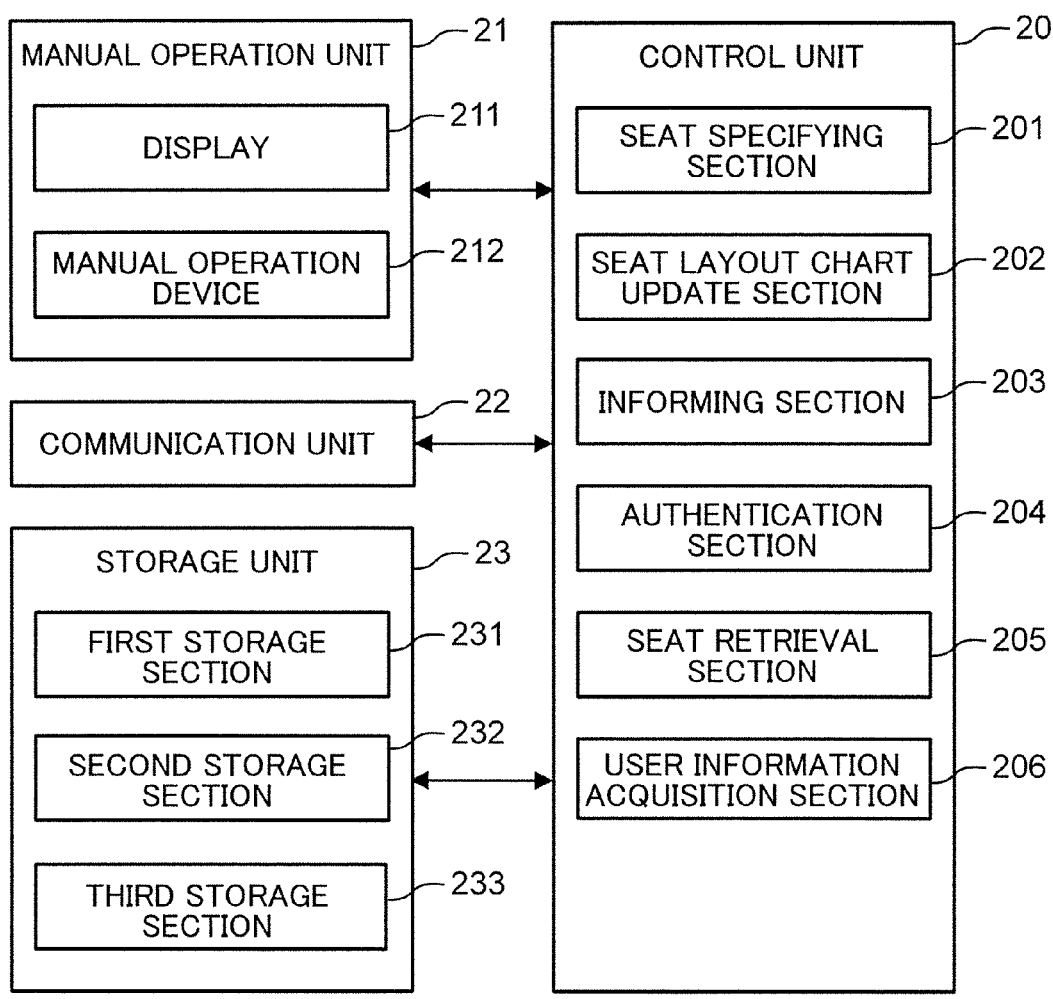
FIG. 4 is a block diagram illustrating an electrical configuration of an information sharing server according to one embodiment of an information management apparatus relating to the present disclosure.

A configuration of the information sharing server 2 will be described below. FIG. 4 is a block diagram illustrating an electrical configuration of the information sharing server 2 according to one embodiment of an information management apparatus relating to the present disclosure. As illustrated in FIG. 4, the information sharing server 2 comprises a manual operation unit 21, a communication unit 22 (receiving section), a storage unit 23, and a control unit 20.

For example, the manual operation unit 21 comprises: a display 211 for displaying information thereon, such as a liquid crystal display; and a manual operation device 212 for allowing a user to perform an operation for various instructions, such as a keyboard or a mouse.

The communication unit 22 is composed of a wired LAN communication module and is configured to perform wired communication between the moving apparatus 1 and the complex machine 3 via the network 91 (FIG. 1). For example, the communication unit 22 is operable to receive the user identification information, the current position information, the transmission direction information and the person detection result information each transmitted by the information transmission section 105 of the moving apparatus 1, and output the received information to the control unit 20.

The storage unit 23 is a storage device such as HDD (Hard Disk Drive). A storage area of the storage unit 23 is used as a first storage section 231, a second storage section 232 and a third storage section 233. Alternatively, a plurality of storage devices may be provided, wherein storage areas of the plurality of storage devices may be used as the first storage section 231, the second storage section 232 and the third storage section 233.

The first storage section 231 pre-stores therein a seat layout chart. The seat layout chart indicates respective layout positions of the plurality of seats within the floor around which the moving apparatus 1 travels. Specifically, the seat layout chart is composed of: a seat layout image depicting the layout positions of the plurality of seats; and seat position information indicating each of the layout positions of the plurality of seats by latitude, longitude and altitude.

Figure 5:
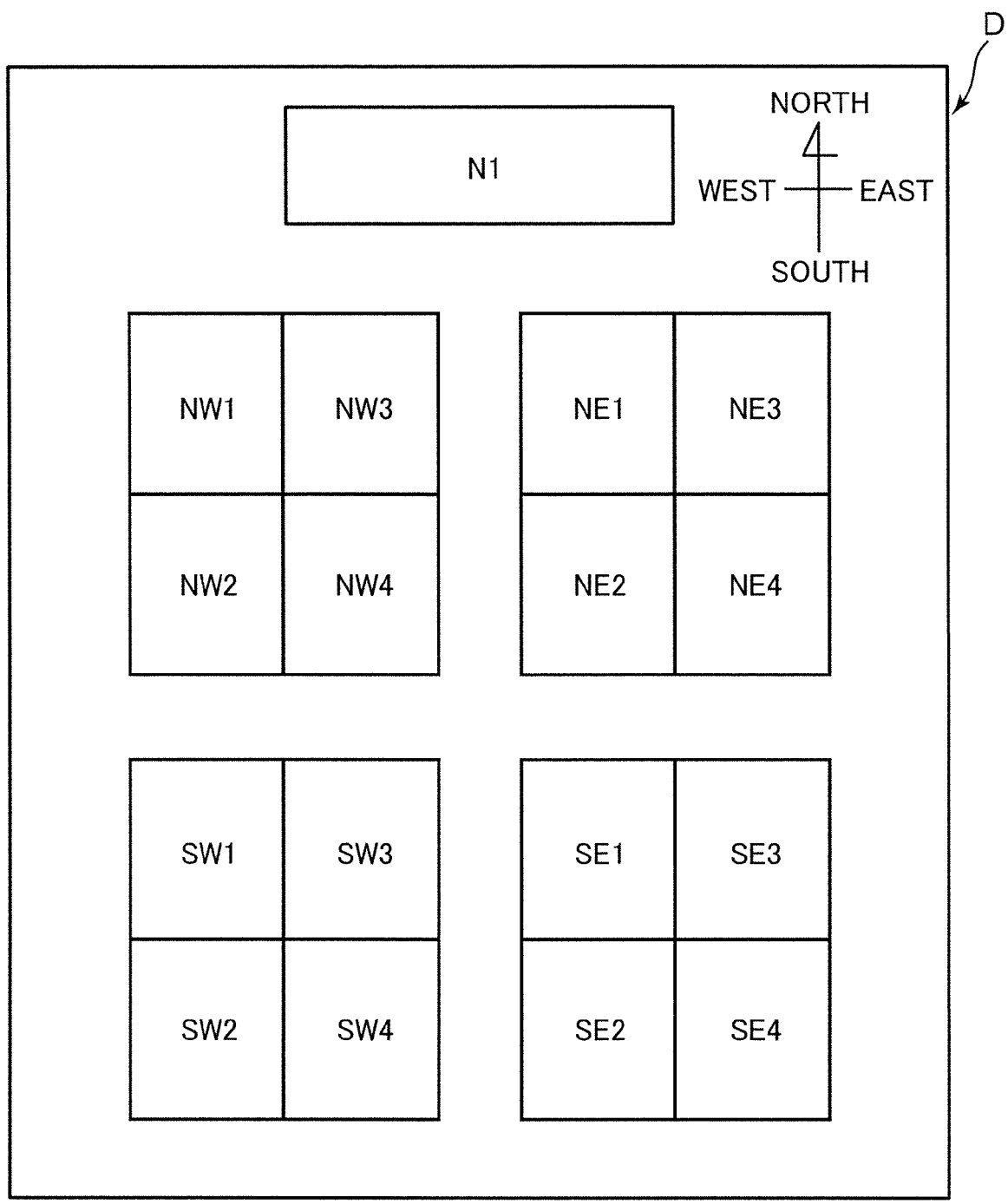
FIG. 5 is a diagram illustrating one example of a seat layout image stored in a first storage section.

FIG. 5 is a diagram illustrating one example of the seat layout image D stored in the first storage section 231. For example, the first storage section 231 stores therein a seat layout image D depicting respective layout positions of seventeen seats within the floor, as illustrated in FIG. 5. In the seat layout image D illustrated in FIG. 5, seventeen pieces of seat identification information SR (seat information) "N1", "NW1" to "NW4", "NE1" to "NE4", "SW1" to "SW4", "SE1" to "SE4" for identifying the respective seats are depicted, respectively, at the layout positions of the seventeen seats.

Figure 6:
FIG. 6 is a diagram illustrating one example of initial seat position information stored in the first storage section.

FIG. 6 is a diagram illustrating one example of initial seat position information M stored in the first storage section 231. The first storage section 231 further stores therein initial seat position information M defining an association between corresponding ones of the seventeen pieces of seat identification information SR "N1", "NW1" to "NW4", "NE1" to "NE4", "SW1" to "SW4", "SE1" to "SE4", and seventeen sets of latitude, longitude and altitude indicating layout positions of the seats identified, respectively, by the seventeen pieces of seat identification information SR, as illustrated in FIG. 6.

For example, in the seat position information M illustrated in FIG. 6, the seat identification information SR "NW1" is associated with the set of latitude "lat1", longitude "lon1" and altitude "alt1" indicating a layout position of one of the seats identified by the seat identification information SR "NW1". The latitude and longitude contained in the seat position information M mean latitude and longitude of a center position of each of the seats. The altitude contained in the seat position information M means altitude of the floor on which the seats are present.

The second storage section 232 stores therein: a plurality of pieces of user identification information; a plurality of passwords to be used, respectively, by a plurality of users identified by the respective piece of user identification information, to certify that each of the users is a user who is allowed to log into each of the information sharing server 2, the complex machine 3 and the terminal devices 4 (i.e., a login-authenticated user); and a plurality of pieces of user information about the respective users, in such a manner as to be associated with each other.

Each piece of user information comprises attribute information about a user associated with each piece of user information, wherein the attribute information is composed of one or more attribute elements, such as department information indicative of a department to which the user belongs, name information indicative of legal name of the user, and/or address information indicative of an e-mail address of the user. The following description will be made on the assumption that each piece of user information comprises three attribute elements: the department information, the name information and the address information.

FIG. 7 is a diagram illustrating one example of the information stored in the second storage section 232. For example, the second storage section 232 stores therein user identification information UR "userA", a password PW "******", department information UF1 "Division o Department o", name information UF2 "First name A Second name A", and address information UF3 "userA@xxx.co.jp", in such a manner as to be associated with each other, as illustrated in FIG. 7.

The third storage section 233 is operable, according to an aftermentioned informing section 203, to store therein each piece of user identification information UR when information coincident therewith is not stored in the second storage section 232.

The control unit 20 is operable to control an operation of each element of the information sharing server 2. For example, the control unit 20 comprises: a non-illustrated CPU capable of performing given arithmetic processing; a non-illustrated non-volatile memory such as EEPROM, storing therein a given control program; a non-illustrated RAM for temporarily storing data therein; and peripheral circuits thereof.

The control unit 20 is operable to instruct the CPU to execute the control program stored in the non-volatile memory to thereby operate, for example, as a seat specifying section 201, a seat layout chart update section 202, an informing section 203, an authentication section 204, a seat retrieval section 205, and a user information acquisition section 206.

The seat specifying section 201 is operable, based on the layout positions of the seats indicated in the seat layout chart stored in the first storage section 231, and the current position information and the transmission direction information received by the communication unit 22, to specify one of the seats on which the terminal device 4 as a replier of the user identification information UR received by the communication section 22 is used. Details of the seat specifying section 201 will be described later.

The seat layout chart update section 202 is operable to store the user identification information UR and others received by the communication unit 22, in the first storage section 231, in such a manner as to be associated with (added to) the seat specified by the seat specifying section 201, in the seat layout chart stored in the first storage section 231, to thereby update the seat layout chart. Details of the seat layout chart update section 202 will be described later.

The informing section 203 is operable, when information coincident with the user identification information UR received by the communication unit 22 is not stored in the second storage section 232, to store the received user identification information UR in the third storage section 233. Additionally, the informing section 203 is operable to inform a given superuser of the fact that an unidentifiable user is present in the seat specified by the seat specifying section 201. Details of the informing section 203 will be described later.

The authentication section 204 is operable, when an aftermentioned login instruction transmitted by the complex machine 3 is received by the communication unit 22, to determine whether or not information coincident with a combination of a piece of user identification information UR and a password PW each contained in the login instruction is stored in the second storage section 232.

When the authentication section 204 determines that information coincident with the combination is stored in the second storage section 232, it is operable, to return, as authentication information, information indicating that a user corresponding to the combination is a login-authenticated user, to the complex machine 3. On the other hand, when the authentication section 204 determines that information coincident with the combination is not stored in the second storage section 232, it is operable, to return, as the authentication information, information indicating that the user corresponding to the combination is not a user who is allowed to log into the complex machine 3 (i.e., a login-unauthenticated user), to the complex machine 3. The term "user corresponding to the combination" means a user identified by the user identification information UR contained in the combination.

The seat retrieval section 205 is operable, when an aftermentioned user seat search instruction transmitted by the complex machine 3 is received by the communication unit 22, to acquire one of the pieces of seat identification information SR contained in the seat position information M, corresponding to aftermentioned user search information contained in the user seat search instruction. Then, the seat retrieval section 205 is operable to return, to the complex machine 3, search result information containing the acquired seat identification information SR. Details of the search result information will be described later.

On the other hand, when the seat position information M does not contain any seat identification information SR corresponding to the aftermentioned user search information, the seat retrieval section 205 is operable to return, to the complex machine 3, non-existence information indicative of the non-existence of a user corresponding to the user search information. Details of the seat retrieval section 205 will be described later.

The user information acquisition section 206 is operable, when an aftermentioned user information acquisition instruction transmitted by the complex machine 3 is received by the communication unit 22, to acquire a piece of user identification information UR contained in the received user information acquisition instruction. Then, the user information acquisition section 206 is operable to return, to the complex machine 3, one of the pieces of user information UF which is stored in the second storage section 232 in association with the acquired user identification information UR.

Figure 8:
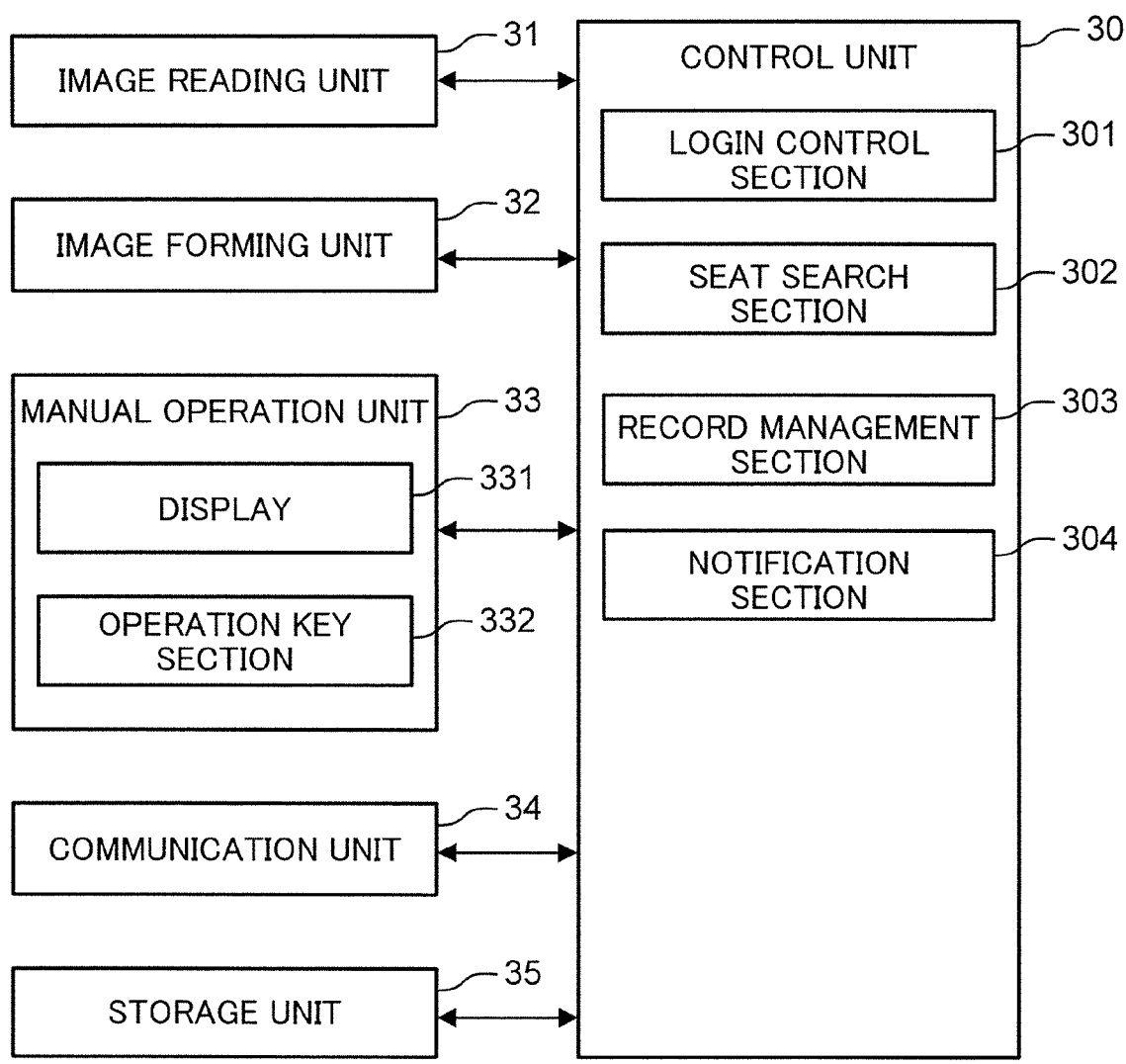
FIG. 8 is a block diagram illustrating an electrical configuration of a complex machine according to one embodiment of an image forming apparatus relating to the present disclosure.

A configuration of the complex machine 3 will be described below. FIG. 8 is a block diagram illustrating an electrical configuration of the complex machine 3 according to one embodiment of an image forming apparatus relating to the present disclosure. As illustrated in FIG. 8, the complex machine 3 comprises an image reading unit 31, an image forming unit 32, a manual operation unit 33, a communication unit 34, a storage unit 35, and a control unit 30.

The image reading unit 31 comprises a non-illustrated optical system unit having a CCD (Charge Coupled Device), an exposure lamp and the like. The optical system unit is operable, under control of the control unit 30, to scan an image of a document placed on a non-illustrated platen to acquire image data and simultaneously output the acquired image data to the control unit 30.

The image forming unit 32 is operable, under control of the control unit 30, to perform a printing operation. More specifically, the image forming unit 32 has a well-known configuration comprising a photosensitive drum, a charging unit, an exposure unit, a development unit, a cleaning unit and the like.

The manual operation unit 33 comprises a display 331 for displaying information thereon, and an operation key section 332 for allowing a user to perform an operation for various instructions. For example, the display 331 is a liquid crystal display having a touch panel function. For example, the operation key section 332 includes various keys such as a start key for issuing an instruction for starting to perform a certain function such as a copy function, and numerical keypad for inputting numerical values and codes.

The communication unit 34 is composed of a wired LAN communication module, and is configured to perform wired communication with the information sharing server 2 via the network 91 (FIG. 1).

The storage unit 35 is a storage device such as HDD or SSD (Solid State Drive). The storage unit 35 is used to store aftermentioned record information and others.

The control unit 30 is operable to control an operation of each element of the complex machine 3. For example, the control unit 30 comprises: a non-illustrated CPU capable of performing given arithmetic processing; a non-illustrated non-volatile memory such as EEPROM, storing therein a given control program; a non-illustrated RAM for temporarily storing data therein; and peripheral circuits thereof, such as a timer for clocking a current time.

The control unit 30 is operable to instruct the CPU to execute the control program stored in the non-volatile memory to thereby operate, for example, as a login control section 301, a seat search section 302, a record management section 303, and a notification section 304.

The login control section 301 is operable to allow a user to log into the complex machine 3. The login control section 301 is also operable to allow a login user, i.e., a user who logs into the complex machine 3, to log out of the complex machine 3. The login control section 301 is operable to accept a login instruction containing a piece of user identification information UR and a password PW each input by a user through the manual operation unit 33, and instruct the communication unit 34 to transmit the accepted login instruction to the information sharing server 2.

Assume that the authentication information returned by the authentication section 204 of the information sharing server 2 in response to the login instruction is received by the communication unit 34. Further, assume the authentication information indicates that a user identified by the user identification information UR contained in the login instruction is a login-authenticated user. In this case, the login control section 301 is operable to store the user identification information UR contained in the login instruction, in the RAM. In this way, the login control section 301 allows the user identified by the user identification information UR to log into the complex machine 3.

Differently from the above, assume the authentication information received by the communication unit 34 indicates that the user identified by the user identification information UR contained in the login instruction is a login-unauthenticated user. In this case, the login control section 301 is operable to refuse the user identified by the user identification information UR contained in the login instruction, from logging into the complex machine 3, and instruct the display 331 to display thereon a warning message indicating that the user identification information UR is unauthorized.

The login control section 301 is also operable to accept a logout instruction input by a login user through the manual operation unit 33. In response to accepting the logout instruction, the login control section 301 is operable to delete the user identification information UR of the login user stored in the RAM. In this way, the login control section 301 allows the login user to log out of the complex machine 3.

The seat search section 302 is operable to accept a user seat search instruction input by a login user through the manual operation unit 33. The user seat search instruction is an instruction for instructing the information sharing server 2 to retrieve one of the seats in which a specific user is currently seated. The user seat search instruction contains user search information. The user search information is information input as a so-called search keyword by the login user in order to retrieve one of the seats in which the specific user is currently seated. For example, the user search information comprises attribute information composed of at least a part of the attribute elements comprised in a specific one of the pieces of user information UF, regarding the specific user The seat search section 302 is operable to instruct the communication unit 34 to transmit the accepted user seat search instruction to the information sharing server 2. Assume that, in response to the user seat search instruction, the search result information containing one of the pieces of seat identification information SR is returned by the seat retrieval section 205 of the information sharing server 2, and the communication unit 34 receives the returned search result information. In this case, the seat search section 302 is operable to instruct the image forming unit 32 to print an image including the seat identification information SR contained in the search result information. Details of the search result information will be described later.

Differently from the above, assume that the absence information is returned by the seat retrieval section 205 of the information sharing server 2, and the communication unit 34 receives the returned non-existence information. In this case, the seat search section 302 is operable to instruct the display 331 to display thereon information indicative of the absence of a user corresponding to the user search information contained in the user seat search instruction. Details of the seat search section 302 will be described later.

The record management section 303 is operable, when an image including one of the pieces of seat identification information SR is printed by the image forming unit 32, to store, in the storage unit 35, record information comprising a piece of user identification information UR of a login user (user of the image forming apparatus) during the printing operation, and the seat identification information SR included in the printed image. Details of the record management section 303 and the record information will be described later.

The notification section 304 is operable, based on the seat layout chart stored in the first storage section 231, and the record information stored in the storage unit 35, to determine whether or not, in one or more of the pierces of seat identification information SR included in images printed by the image forming unit 32, there is a pierce of seat identification information SR which is associated with given information updated after the printing operation in the seat position information M.

When the notification section 304 determine that there is a pierce of seat identification information SR associated with the updated given information, to notify a login user who printed an image including the pierce of seat identification information SR, of a fact that a user seated in a seat indicated by the pierce of seat identification information SR becomes unseated from the seat. Details of the notification section 304 will be described later.

Figure 9:
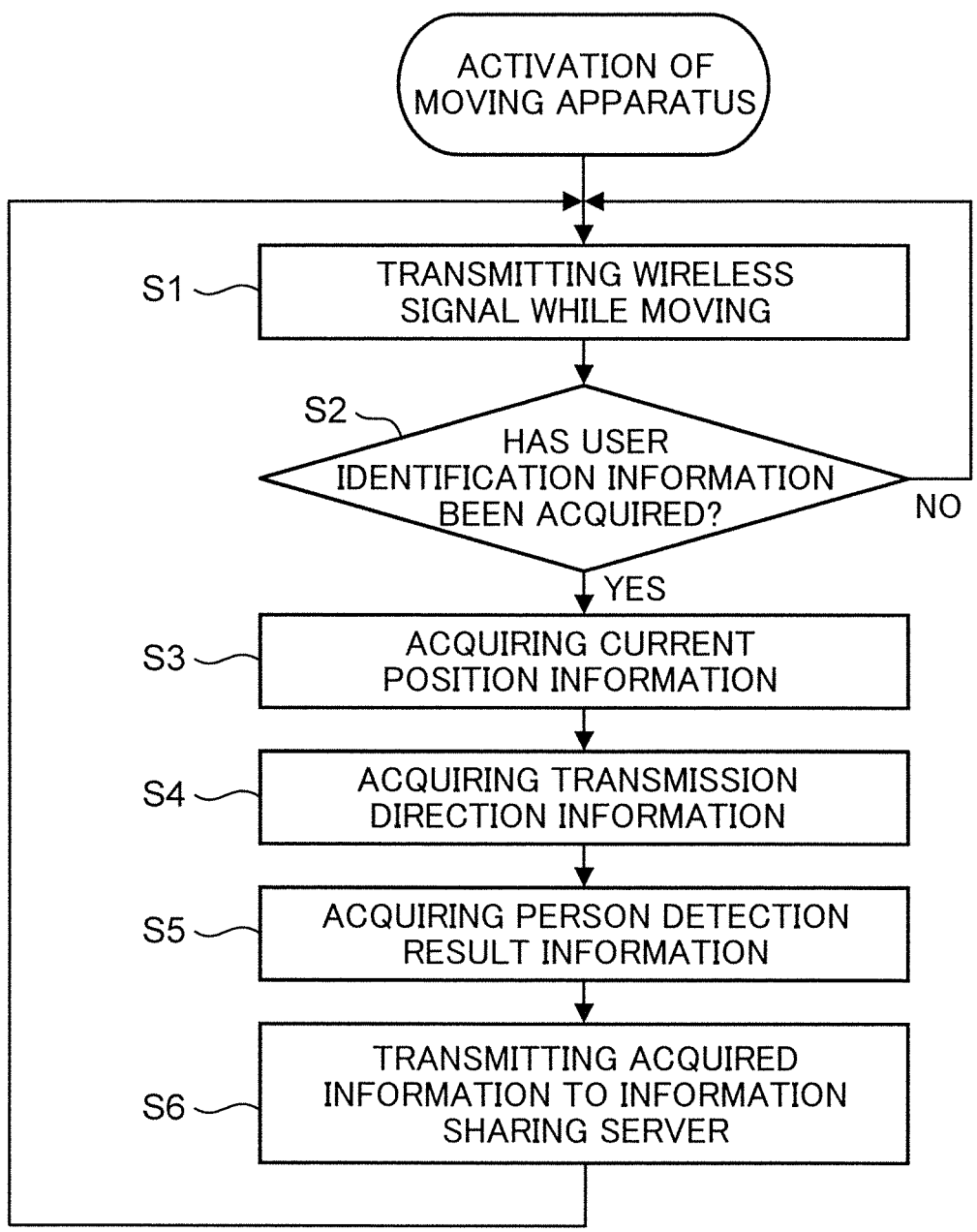
FIG. 9 is a flowchart illustrating an operation of the moving apparatus.
Figure 10:
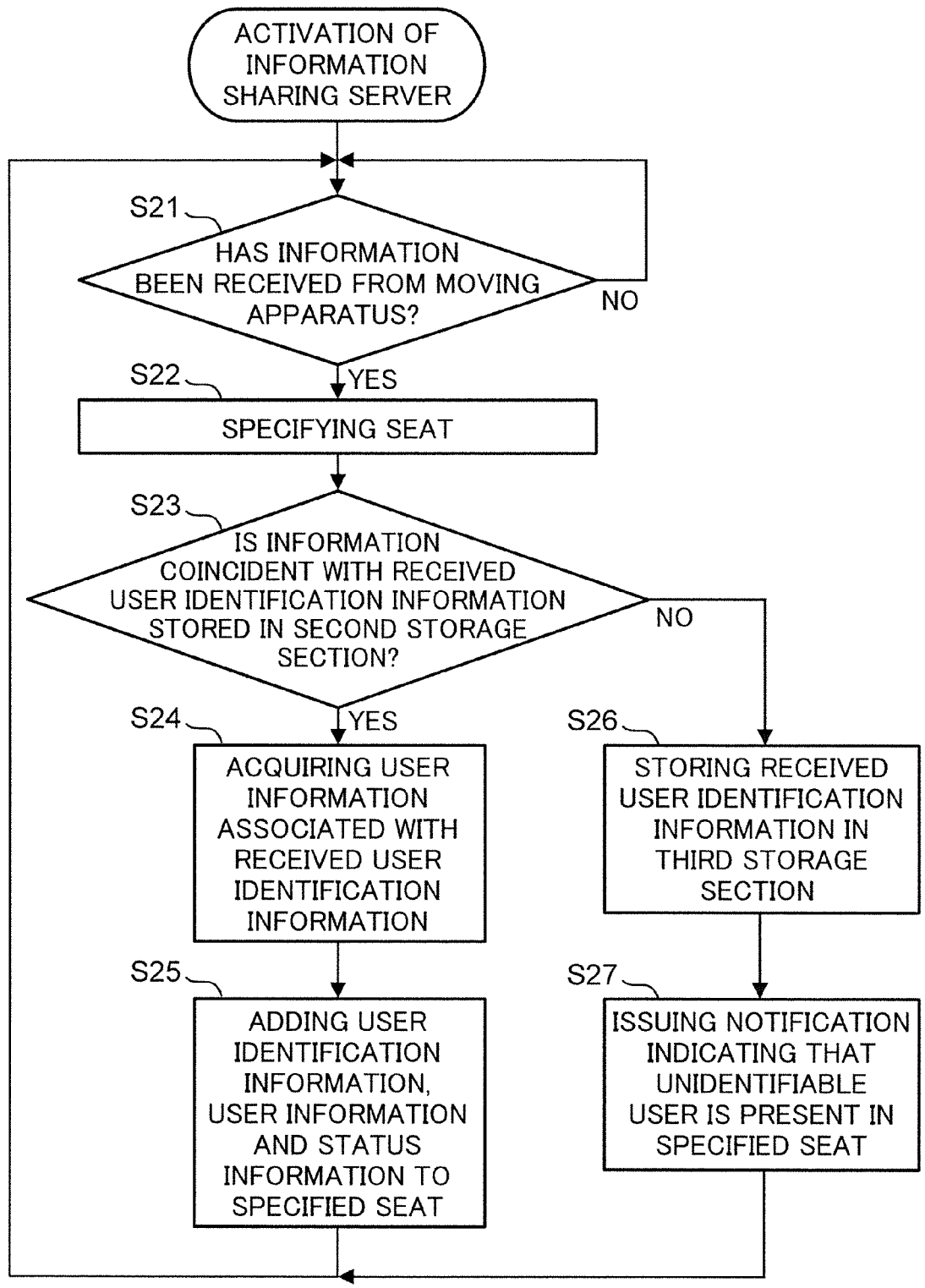
FIG. 10 is a flowchart illustrating an operation of the information sharing server.

An operation of updating the seat layout chart stored in the first storage section 231 will be described below. Through the following description, the operation of the moving apparatus 1, and details of the seat specifying section 201, the seat layout chart update section 202 and the informing section 203 will be described. FIG. 9 is a flowchart illustrating the operation of the moving apparatus 1. FIG. 10 is a flowchart illustrating the operation of the information sharing server 2.

The following description will be made on the assumption that the first storage section 231 stores therein a seat layout chart comprising the seat layout image D illustrated in FIG. 5 and the seat position information M illustrated in FIG. 6. It will also be made on the assumption that the second storage section 232 stores therein corresponding ones of a plurality of pieces of user identification information UR and a plurality of pieces of user information UF, in such a manner as to be associated with each other, as illustrated in FIG. 7.

As illustrated in FIG. 9, upon activation of the moving apparatus 1, the drive control section 101 controls the drive unit 15 to allow the moving apparatus 1 to autonomously move. Thus, the moving apparatus 1 travels within the floor while avoiding an obstacle. Concurrently, every time a given time elapses, the identification information acquisition section 102 instructs the second communication unit 17 to transmit the wireless signal (S1). The moving apparatus 1 will continue the operation of transmitting the wireless signal every time a given time elapses, while autonomously moving within the floor.

When the user identification information UR is acquired by the identification information acquisition section 102 (S2: YES), the information transmission section 105 instructs the position acquisition section 103 to acquire the current position information (S3) and instruct the direction acquisition section 104 to acquire the transmission direction information (S4), and to acquire the person detection result information output by the human sensor unit 12 (S5).

Then, the information transmission section 105 instructs the first communication unit 16 to transmit, to the information sharing server 2, the user identification information UR received in the step S2, the current position information acquired in the step S3, the transmission direction information acquired in the step S4, and the person detection result information acquired in the step S5 (S6). Subsequently, processing in and after the step S1 will be repeated.

Assume that, after activation of the information sharing server 2, the communication unit 22 of the information sharing server 2 receives the user identification information UR and other information transmitted by the information transmission section 105, as illustrated in FIG. 10, and outputs the received information to the control unit 20 (S21: YES).

In this case, based on respective layout positions of the seats indicated in the seat layout chart stored in the first storage section 231, and the current position information and the transmission direction information received in the step S21, the seat specifying section 201 specifies one of the seats on which the terminal device 4 as a replier of the user identification information UR received in the step 21 is used (S22).

A specific example of the seat specifying operation performed by the seat specifying section 201 in the step S22 will be described here. In this specific example, assume that the moving apparatus 1 moves within the floor toward true north, in the vicinity of the seat identified by the seat identification information SR "NW2", as illustrated in FIGS. 3 and 5. Further, assume that, in the step S2 (FIG. 9), the identification information acquisition section 102 acquires the user identification information UR "userA" returned by the terminal device 4 which is used on the seat identified by the seat identification information SR "NW2".

Further, assume that, in the step S6 (FIG. 9), the information transmission section 105 operates to transmit: the user identification information UR "userA"; information indicative of latitude "lat2", longitude "lonX" and altitude "alt1" of a current position of the moving apparatus 1, as the current position information; information indicative of "90°", i.e., a true east direction, as the transmission direction information; and information indicative of the absence of a person P, as the person detection result information. Further, assume that, in the step S21, the communication unit 22 receives the above information transmitted from the information transmission section 105, and outputs the received information to the control units 20.

In this case, in the step S22, the seat specifying section 201 refers to a plurality of sets of latitude, longitude and altitude, each associated with a respective one of the pieces of seat identification information SR comprised in the seat position information M (FIG. 6) stored in the first storage section 231. Then, the seat specifying section 201 specifies a set of latitude "lat2", longitude "lon1" and altitude "alt1", which is closest in the true east direction indicated by "90°" as the transmission direction information received by the communication unit 22, from the set of latitude "lat2", longitude "lonX" and altitude "alt1" indicated by the current position information received by the communication unit 22. Then, the seat specifying section 201 specifies one of the seats which is identified by the seat identification information SR "NW2" with which the specified set of latitude "lat2", longitude "lon1" and altitude "alt1" is associated, as one of the seats on which the terminal device 4 as a replier of the user identification information UR "userA" is used.

Refer to FIG. 10 again. Subsequently, the informing section 203 determines whether or not information coincident with the user identification information UR received in the step S21 is stored in the second storage section 232 (S23).

Assume that, in the step S23, the informing section 203 determines that information coincident with the user identification information UR received in the step S21 is stored in the second storage section 232 (S23: YES). In this case, the seat layout chart update section 202 acquires one of the pieces of user information UF, which is stored in the second storage section 232 in association with the received user identification information UR (S24).

In this specific example, the user identification information UR "userA" is stored in the second storage section 232, as illustrated in FIG. 7. Thus, in the step S23, the informing section 203 determines that information coincident with the user identification information UR "userA" received in the step S21 is stored in the second storage section 232.

In this case, in the step S24, the seat layout chart update section 202 acquires one of the pieces of user information UF, which comprises the department information UF1 "Division ○ Department ○", the name information UF2 "First name A Second name A", and the address information UF3 "userA@xxx.co.jp" each stored in the second storage section 232 in association of the user identification information UR "userA".

Then, the seat layout chart update section 202 stores the user identification information UR received in the step S21 and the user information UF acquired in the step S24, in such a manner as to be associated with the seat identification information SR indicative of the seat specified in the step S22, in the seat position information M stored in the first storage section 231 (S25).

Further, assume that, in the step S21, information indicative of the presence of a person P is received as the person detection result information. In this case, in the step S25, the seat layout chart update section 202 further stores information indicative of a seated state as status information ST, in such a manner as to be associated with the seat identification information SR indicative of the seat specified in the step S22, in the seat position information M.

Differently from the above, assume that information indicative of the absence of a person P is received as the person detection result information, in the step S21. In this case, in the step S25, the seat layout chart update section 202 further stores information indicative of an unseated state as the status information ST, in such a manner as to be associated with the seat identification information SR indicative of the seat specified in the step S22, in the seat position information M.

FIG. 11 is a diagram illustrating one example of updated seat position information M stored in the first storage section 231. As an example, assume that, in the step S21, information indicative of the absence of a person P is output as the person detection result information to the control unit 10, as described in the above specific example. Further, assume that, in the step S22, the seat specifying section 201 specifies one of the seats which is identified by the seat identification information SR "NW2", as one of the seats on which the terminal device 4 as a replier of the user identification information UR "userA" is used. Further, assume that, in the step S24, the seat layout chart update section 202 acquires one of the pieces of user information UF, which comprises the department information UF1 "Division o Department o", the name information UF2 "First name A Second name A", and the address information UF3 "userA@xxx.co.jp" each stored in the second storage section 232 in association of the user identification information UR "userA".

In this case, in the step S25, the seat layout chart update section 202 stores the user identification information UR "userA" received in the step S21, and the user information UF comprising the department information UF1 "Division o Department o", the name information UF2 "First name A Second name A", and the address information UF3 "userA@xxx.co.jp", in such a manner as to be associated with the seat identification information SR "NW2", as illustrated in FIG. 11. The person detection result information received in the step S21 is indicative of the absence of a person P, so that the seat layout chart update section 202 further stores information indicative of an unseated state as the status information ST, in such a manner as to be associated with the seat identification information SR "NW2".

As a case different from the above specific example, assume that, in the step S21, the user identification information UR "userB" and information indicative of the presence of a person P as the person detection result information are received, and output to the control unit 10. Further, assume that, in the step S22, the seat specifying section 201 specifies one of the seats which is identified by the seat identification information SR "NW1", as one of the seats on which the terminal device 4 as a replier of the user identification information UR "userB" is used. Further, assume that, in the step S24, the seat layout chart update section 202 acquires one of the pieces of user information UF, which comprises the department information UF1 "Division o Department o", the name information UF2 "First name B Second name B", and the address information UF3 "userB@xxx.co.jp" each stored in the second storage section 232 in association of the user identification information UR "userB".

In this case, in the step S25, the seat layout chart update section 202 stores the user identification information UR "userB", and the user information UF comprising the department information UF1 "Division o Department o", the name information UF2 "First name B Second name B", and the address information UF3 "userB@xxx.co.jp", in such a manner as to be associated with the seat identification information SR "NW1", as illustrated in FIG. 11. The person detection result information received in the step S21 is indicative of the presence of a person P, so that the seat layout chart update section 202 further stores information indicative of a seated state as the status information ST, in such a manner as to be associated with the seat identification information SR "NW1".

In this manner, in the step S25, the seat layout chart update section 202 stores the user identification information UR, the user information UF and the status information S, in such a manner as to be associated with (added to) the seat identification information SR indicative of the seat specified in the step S22, in the seat position information M stored in the first storage section 231, to thereby update the seat layout chart stored in the first storage section 231.

On the other hand, when, in the step S23, the informing section 203 determines that information coincident with the user identification information UR received in the step S21 is not stored in the second storage section 23 (S23: NO), it stores the user identification information UR in the third storage section 233 (S26). The informing section 203 also informs a given superuser of the fact that an unidentifiable user is present in the seat specified in the step S22 (S27).

As an example, assume that, in the step S21, the communication unit 22 receives the user identification information UR "guest". Further, assume that, in the step S22, the seat specifying section 201 specifies one of the seats which is identified by the seat identification information SR "N1".

In this case, the user identification information UR "guest" is not stored in the second storage section 232, as illustrated in FIG. 7. Thus, in the step S23, the informing section 203 determines that information coincident with the user identification information UR "guest" is not stored in the second storage section 232. Then, in the step S26, the informing section 203 stores the user identification information UR "guest" in the third storage section 233.

Then, in the step S27, the informing section 203 acquires user information UF stored in the second storage section 232 in association with the user identification information UR "sysuser" for the superuser (FIG. 7). The informing section 203 creates an e-mail containing a message indicating that an unidentifiable user is present in the seat specified in the step S22 and identified by the seat identification information SR "N1". Then, the informing section 203 operates to transmit the created e-mail to the mail address "sysuser xxx.co.jp" indicated in the address information UF3 comprised in the acquired user identification information UR, through the communication unit 22.

In this way, in the step S27, the informing section 203 informs the superuser identified by the user identification information UR "sysuser", of the fact that an unidentifiable user is present in the seat specified in the step S22.

Figure 12:
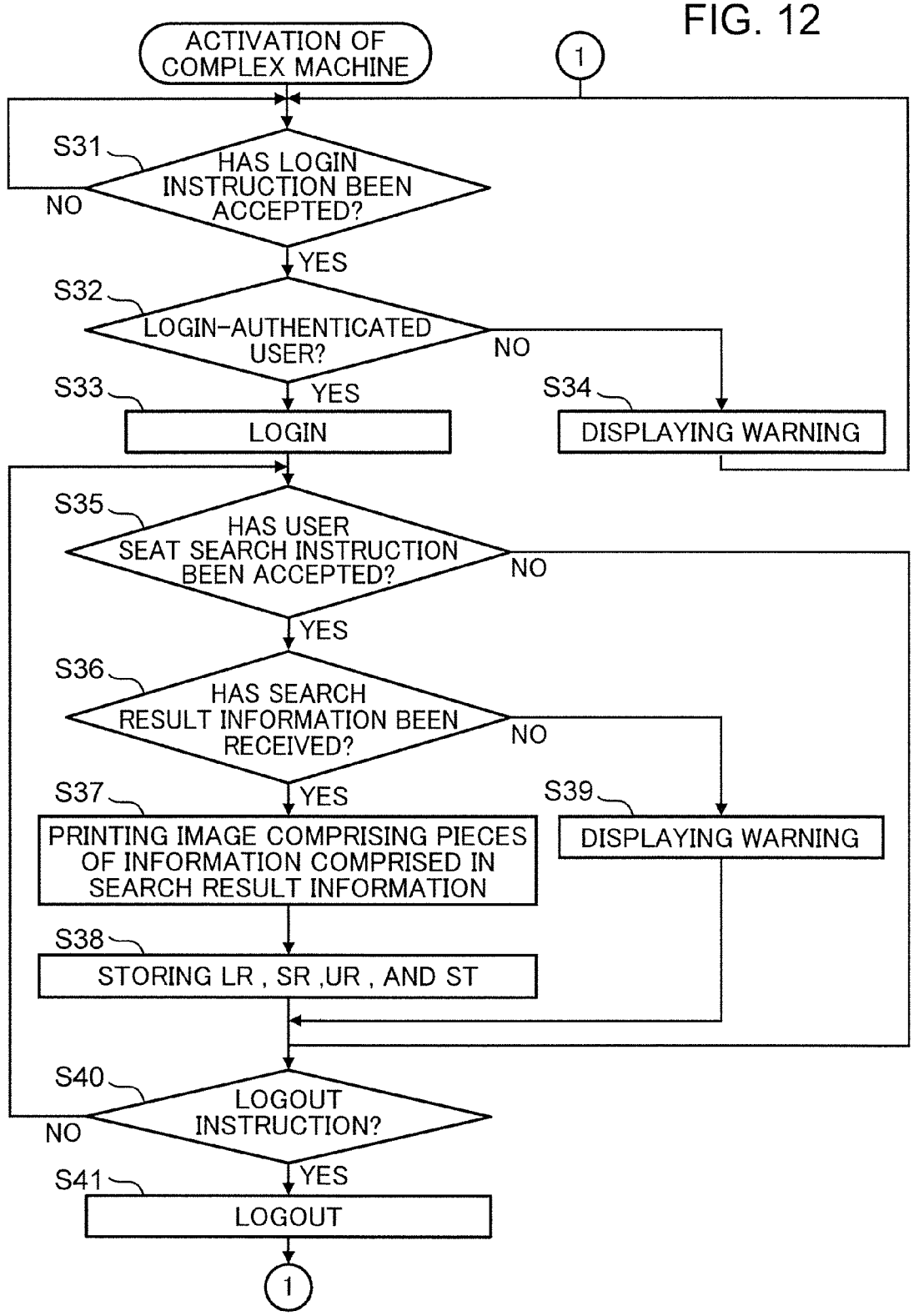
FIG. 12 is a flowchart illustrating a seat layout chart printing operation in the complex machine.

A seat layout chart printing operation in the complex machine 3 will be described below. Through the following description, details of the seat retrieval section 205, the seat search section 302 and the record management section 303, and details of the search result information and the record information. FIG. 12 is a flowchart illustrating a printing operation of a seat layout chart in the complex machine 3.

As illustrated in FIG. 12, after activation of the complex machine 3, in response to accepting the login instruction containing a piece of user identification information UR and a password PW each input by a user through the manual operation unit 33, the login control section 301 instructs the communication unit 34 to transmit the accepted login instruction to the information sharing server 2 (S31: YES).

Assume that the authentication information returned by the authentication section 204 in response to the login instruction indicates that a user identified by the user identification information UR contained in the login instruction is a login-authenticated user (S32: YES). In this case, the login control section 301 stores the user identification information UR contained in the login instruction, in the RAM, to thereby allow the user identified by the user identification information UR to log into the complex machine 3 (S33).

As an example, assume that the second storage section 232 stores therein corresponding ones of a plurality of pieces of user identification information UR, a plurality of passwords PW and a plurality of pieces of user information UF, in such a manner as to be associated with each other, as illustrated in FIG. 7. Further, assume that, in the step S31, a login instruction containing the user identification information UR "userG", and the password "****" is transmitted to the information sharing server 2**.

In this case, information coincident with a combination of the user identification information UR "userG", and the password "****" contained in the login instruction received by the communication unit 22 is stored in the second storage section 232. Thus, the authentication section 204 returns, as the authentication information, information indicating that a user identified by the user identification information UR "userG" is a login-authenticated user. Thus, in the step S33, the login control section 301 stores the user identification information UR "userG" in the RAM to thereby allow a user identified by the user identification information UR "userG" to log into the complex machine 3**.

Differently from the above, assume that the authentication information returned by the authentication section 204 indicates that a user identified by the user identification information UR contained in the login instruction is a login-unauthenticated user (S32: NO). In this case, the login control section 301 instructs the display 331 to display thereon a warning message indicating that the user identification information UR input by the user is unauthorized (S34). Then, processing in and after the step S31 will be repeated.

Subsequently, in response to accepting a user seat search instruction input by a login user who logs into the complex machine 3 in the step S33, the seat search section 302 instructs the communication unit 34 to transmit the accepted user seat search instruction to the information sharing server 2 (S35: YES).

Assume that the user seat search instruction transmitted in the step S35 is then received by the communication unit 22. In this case, the seat retrieval section 205 returns, as the search result information, information comprising: one of the pieces of seat identification information SR, associated with one of the pieces of user information UF in the seat position information M, wherein the user information UF comprises information coincident with the user search information contained in the received user seat search instruction; one of the pieces of user identification information UR and one of the pieces of user information UF each associated with the seat identification information SR in the seat position information M; and aftermentioned status information ST, to the complex machine 3.

On the other hand, in the case where there is no seat identification information SR associated with one of the pieces of user information UF comprising information coincident with the user search information exists in the seat position information M stored in the first storage section 231, the seat retrieval section 205 returns, to the composite machine 3, the non-existence indicative of the non-existence of a user corresponding to the user search information.

Assume that the communication unit 34 receives the search result information, as a result of transmission of the user seat search instruction to the information sharing server 2 in the step S35 (S36: YES). In this case, the seat search section 302 instructs the image forming unit 32 to print an image comprising: the seat identification information SR, the user identification information UR, the user information UF and the status information ST each comprised in the received search result information (S37).

After execution of the step S37, the record management section 303 acquires, from the RAM, the user identification information UR indicative of the login user who has logged into the complex machine 3 during the printing operation in the step S37. Then, the record management section 303 stores, in the storage unit 35, the acquired user identification information UR indicative of the login user (hereinafter referred to as "login user identification information LR"); the seat identification information SR printed in the step S37; the user identification information UR printed in the step S37; and the status information ST, in such a manner as to be associated with each other (S38).

Differently from the above, assume that the communication unit 34 receives the non-existence information, as a result of transmission of the user seat search instruction to the information sharing server 2 in the step S35 (S36: NO). In this case, the seat search section 302 instructs the display 331 to display thereon a warning message indicative of the non-existence of the user corresponding to the user search information contained in the user seat search instruction transmitted in the step S35 (S39).

The operations in the steps S35 to S39 will be more specifically described below. As an example, assume that a seat layout chart comprising the seat layout image D illustrated in FIG. 5 and the updated seat position information M illustrated in FIG. 11 is stored in the first storage section 231. Further, assume that the second storage section 232 stores therein corresponding ones of a plurality of pieces of user identification information UR and a plurality of pieces of user information UF, in such a manner as to be associated with each other, as illustrated in FIG. 7.

In this situation, assume that, in the step S33, a user identified by the user identification information UR "userG" logs into the complex machine 3. Further, assume that the login user then enters a user seat search instruction containing the name information UF2 "First name A Second name A" as the user search information, to search one of the seats in which a user indicated by the user identification information UR "userA" is currently seated.

In this case, in the step S35, the seat search section 302 accepts the user seat search instruction, and instructs the communication unit 34 to transmit the accepted user seat search instruction to the information sharing server 2.

In response to the user seat search instruction, the seat retrieval section 205 acquires the seat identification information SR "NW2" associated with one of the pieces of user information UF, which comprises information coincident with the name information UF2 "First name A Second name A" contained in the user seat search instruction as the user search information, in the seat position information M as illustrated in FIG. 11.

Then, the seat retrieval section 205 acquires the user identification information UR "userA", the user information UF comprising the department information UF1 "Division ○ Department ○", the name information UF2 "First name A Second name A", and the address information UF3 "userA@xxx.co.jp", and the status information ST "unseated", each associated with the acquired seat identification information SR "NW2" in the seat position information M.

Then, the seat retrieval section 205 returns, as the search result information, information comprising: the acquired seat identification information SR "NW2"; the acquired user identification information UR "userA"; the acquired user information UF comprising the department information UF1 "Division ○ Department ○", the name information UF2 "First name A Second name A", and the address information UF3 "userA@xxx.co.jp"; the acquired status information ST "unseated"; and the seat layout image D (FIG. 5) stored in the first storage section 231, to the complex machine 3.

Figure 13:
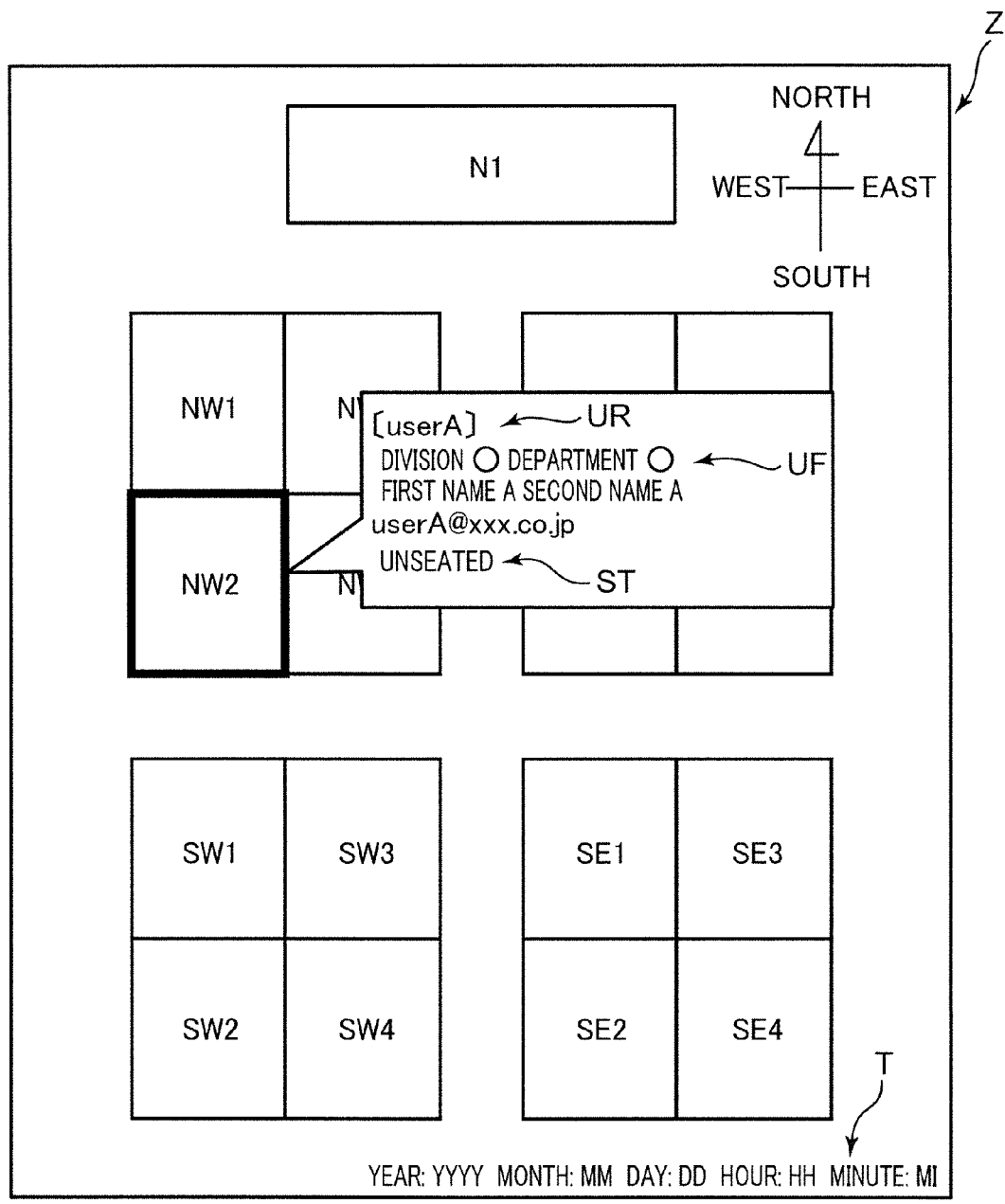
FIG. 13 is a diagram illustrating one example of an image to be printed by the complex machine.

FIG. 13 is a diagram illustrating one example of an image Z to be printed by the complex machine 3. As a result, in the step S36, the search result information is received by the communication unit 34. Then, in the step S37, by using the received search result information, the seat search section 302 creates an image Z including the seat identification information SR "NW2" contained in the search result information, as illustrated in FIG. 13.

Specifically, the seat search section 302 depicts a layout position of a seat identified by the seat identification information SR "NW2" contained in the search result information, in the seat layout image D comprised in the search result information, in such a manner that it is enclosed by a heavy line. The seat search section 302 also depicts, the user information UF and the status information ST "unseated" each comprised in the search result information, in such a manner as to be associated with the seat. The seat search section 302 further depicts a current time T clocked by a timer circuit. In this manner, the seat search section 302 creates the image Z including the seat identification information SR "NW2". Then, the seat search section 302 instructs the informing section 32 to print the created image Z.

Figure 14:
FIG. 14 is a diagram illustrating one example of record information stored in a storage section of the complex machine.

FIG. 14 is a diagram illustrating one example of the record information H stored in the storage unit 35 of the complex machine 3. After execution of the step S37, in the step S38, the record management section 303 acquires, from the RAM, the user identification information UR (login user identification information LR) "userG" of the login user who has logged into the complex machine 3 during the printing operation in the step S37. Then, the record management section 303 stores, in the storage unit 35, the record information H comprising: the acquired login user identification information LR "userG"; the seat identification information SR "NW2" included in the image Z printed in the step S37; the user identification information UR "userA" included in the image Z; and the status information ST "unseated" included in the image Z, in such a manner as to be associated with each other, as illustrated in FIG. 14.

Differently from the above, assume that the above login user (user identified by the login user identification information LR "userG") searches a seat in which a user identified by the user identification information UR "userX" which is not stored in the second storage section 232. Further, assume that, for this purpose, the login user enters a user seat search instruction containing, as the user search information, name information "First name X Second name X" indicating the name of the user identified by the user identification information UR "userX".

In this case, in the step S35, the seat search section 302 accepts the user seat search instruction, and instructs the communication unit 34 to transmit the accepted user seat search instruction to the information sharing server 2.

In response to the user seat search instruction, the seat retrieval section 205 returns the non-existence information to the complex machine 3, because there is no seat identification information SR associated with one of the pieces of user information UF comprising information coincident with the user search information "First name X Second name X" contained in the received user seat search instruction exists in the seat position information M, as illustrated in FIG. 11.

Thus, in the step S36, the non-existence information is received by the communication unit 34. In this case, in the step S39, the seat search section 302 instructs the display 331 to display thereon a warning message indicative of the non-existence of a user corresponding to the user search information "First name X Second name X".

Refer to FIG. 12 again. When the step S38 is executed, or when the step S39 is executed, or when, in the step S35, no user seat search instruction is accepted (S35: NO), processing in and after the step S35 will be repeated until a logout instruction is accepted by the login control section 301 (S40: NO).

Assume that, after execution of the step S38, or after execution of the step S39, or when, in the step S35, no user seat search instruction is accepted (S35: NO), the login control section 301 accepts a logout instruction (S40: YES). In this case, the login control section 301 deletes the user identification information UR stored in the RAM in the step S33. Thus, the login control section 301 allows the login user identified by the user identification information UR to log out of the complex machine 3 (S41). Subsequently, processing in and after the steps S31 will be repeated.

For example, FIG. 14 shows that, after the login user identified by the login user identification information LR "userG" as described in the above specific example logs out of the complex machine 3, in the step S33, a user identification information UR "userF" logs into the complex machine 3, and, as a result of execution of the steps S35 to S38, information comprising the login user identification information LR "userF", the seat identification information SR "NW1", the user identification information UR "userB" and the status information ST "seated", in such a manner as to be associated with each other, is further stored as the record information H in the storage unit 35.

Figure 15:
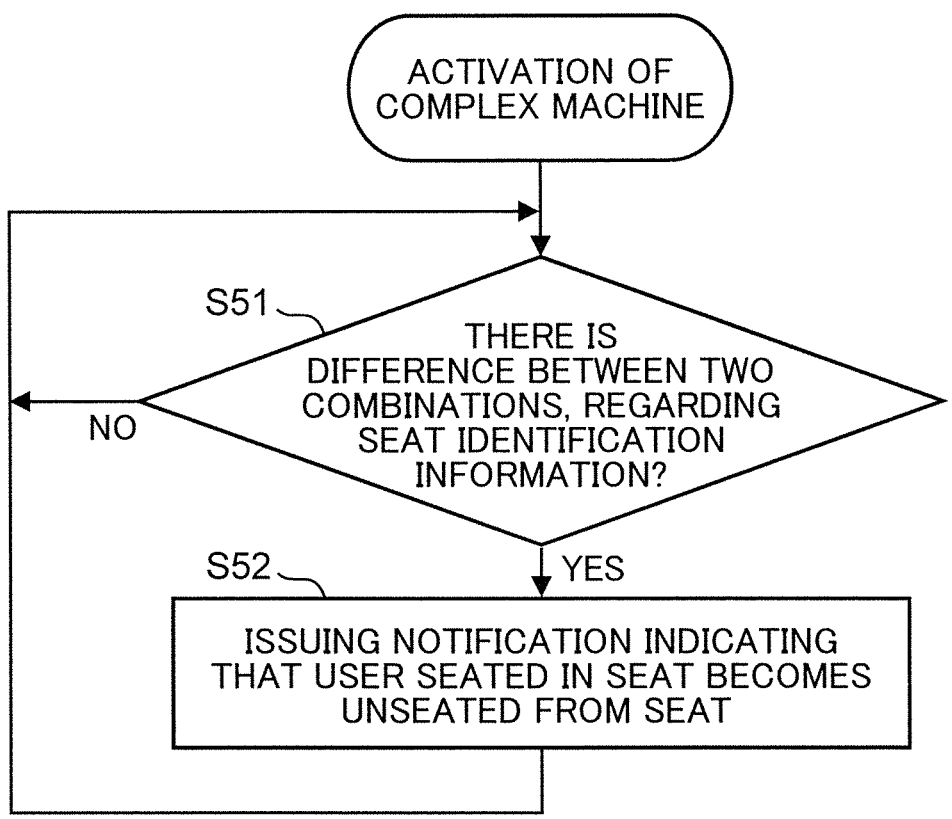
FIG. 15 is a flowchart illustrating an operation of issuing, by a notification section, a notification indicating that a user seated in a seat becomes unseated from the seat.

An operation performed in the complex machine 3 to issue a notification indicating that a user seated in a seat becomes unseated from the seat will be described below. In this description, details of the notification section 304 will also be described. FIG. 15 is a flowchart illustrating an operation of issuing by the notification section 304, a notification indicating that a user seated in a seat becomes unseated from the seat.

As illustrated in FIG. 15, after activation of the complex machine 3, independently of the operation illustrated in FIG. 12, every time a given time elapses, the notification section 304 determines whether or not, regarding one of the pieces of seat identification information SR, there is a difference between a combination of the user identification information UR and a state ("seated" or "unseated") indicated by the status information ST associated with each other in the seat position information M stored in the first storage section 231 and a combination of the user identification information UR and a state indicated by the status information ST associated with each other in the record information H stored in the storage unit 35 (S51).

Assume that, in the step S51, the notification section 304 determines that there is a difference between the combinations regarding one of the pieces of seat identification information SR (S51: YES). In this case, the notification section 304 notifies a login user identified by login user identification information LR stored in the storage unit 35 in association with the seat identification information SR, of a fact that a user seated in one of the seats identified by the seat identification information SR becomes unseated from the seat (S52). Subsequently, the notification section 304 will repeat processing in and after the step S51.

On the other hand, when the notification section 304 determines, in the step S51, that there is no difference between the combinations regarding any one of the pieces of seat identification information SR (S51: NO), it will repeat processing in and after the step S51.

FIG. 16 is a drawing illustrating a different example from that in FIG. 11, illustrating updated seat position information M stored in the first storage section 231. As an example, assumes that the seat position information M illustrated in FIG. 16 is stored in the first storage section 231 when the notification section 304 executes the step S51. Further, assumes that the storage unit 35 of the complex machine 3 stores therein the record information H illustrated in FIG. 14. Further, assumes that the second storage section 232 stores therein corresponding ones of a plurality of pieces of user identification information UR, a plurality of passwords PW and a plurality of pieces of user information UF, in such a manner as to be associated with each other as illustrated in FIG. 7.

In this case, as illustrated in FIG. 16, in the seat position information M stored in the first storage section 231, the user identification information UR "userA" and the status information ST "seated" are associated with the seat identification information SR "NW2". On the other hand, as illustrated in FIG. 14, in the record information H stored in the storage unit 35, the user identification information UR "userA" and the status information ST "unseated" are associated with the seat identification information SR "NW2".

In this case, a combination "userA+seated state" of the user identification information UR "userA" and the status information ST "seated" associated with the seat identification information SR "NW2" in the seat position information M is different from a combination "userA+unseated" of the user identification information UR "userA" and the status information ST "unseated state" associated with the seat identification information SR "NW2" in the record information H. Thus, in the step S51, the notification section 304 determines that there is a difference between the two combinations regarding the seat identification information SR "NW2".

In this case, in the step S52, the notification section 304 creates an e-mail containing a message indicating that a user seated in a seat identified by the seat identification information SR "NW2" becomes unseated from the seat. Then, the notification section 304 acquires the login user identification information LR "userG" associated with the seat identification information SR "NW2" in the record information H. The notification section 304 instructs the communication unit 34 to transmit, to the information sharing server 2, a user information acquisition instruction containing the user identification information UR "userG" for a login user indicated by the acquired login user identification information LR "userG".

In response to receiving the user information acquisition instruction by the communication unit 22, the user information acquisition section 206 returns, to the complex machine 3, the user information UF comprising the department information UF1 "Division ● Department ●", the name information UF2 "First name G Second name G", and the address information UF3 "userG@xxx.co.jp", stored in the second storage section 232 in association with the user identification information UR "userG" comprised in the received user information acquisition instruction.

Then, the notification section 304 instructs the communication unit 34 to transmit the e-mail containing a message indicating that a user seated in a seat identified by the seat identification information SR "NW2" becomes unseated from the seat, to the mail address "userG@xxx.co.jp" indicated in the address information UF3 comprised in the user information UF received by the communication unit 34.

In this way, in the step S52, the notification section 304 notifies the login user identified by the user identification information UR "userG" stored in the storage unit 35 in association with the seat identification information SR "NW2", of the fast that a user seated in a seat identified by the seat identification information SR "NW2" becomes unseated from the seat.

As above, in the above embodiment, even in a situation where a plurality of wirelessly communicatable terminal devices 4 are used, respectively, on a plurality of seats within a floor, by using: a set of latitude, longitude and altitude of each seat indicated in the seat position information M; a current position of the moving apparatus 1 indicated by current position information acquired by the moving apparatus 1; and a transmission direction of a wireless signal indicated by transmission direction information acquired by the moving apparatus 1, the seat specifying section 201 can accurately specify one of the seats on which a specific one of the terminal devices 4 returning user identification information UR in response to the wireless signal is used.

Then, the seat layout chart update section 202 is operable to update the seat position information M by associating the user identification information UR returned by the specific terminal device 4 with one of a plurality of pieces of seat identification information SR, which identifies the seat specified by the seat specifying section 201 and included in the seat position information M.

Therefore, even in the situation where the plurality of wirelessly communicatable terminal devices 4 are used, respectively, on the plurality of seats within the floor, by referring to the updated seat position information M, it is possible to figure out that a seated position of a user identified by the returned user identification information UR is indicated as one of the seats identified by one of the pieces of seat identification information SR associated with the returned user identification information UR in the updated seat position information M.

In the above embodiment, in the operation of updating the seat position information M, the seat layout chart update section 202 is operable to additionally associate the status information ST indicative of a seated state or an unseated state, which corresponds to a result of the detection of the presence or absence of a person P by the human sensor unit 12, with the seat identification information SR indicating the seat specified by the seat specifying section 201, in the seat position information M.

Thus, by referring to the status information ST associated with one of the pieces of seat identification information SR in the updated seat position information M, it is possible to figure out whether or not a user identified by the user identification information UR associated with the seat identification information SR is currently seated in the seat identified by the seat identification information SR.

In the above embodiment, in the operation of updating the seat position information M, the seat layout chart update section 202 is operable to additionally associate one of the pieces of user information UF stored in the second storage section 232 in association with the user identification information UR acquired by the moving apparatus 1, with the seat identification information SR indicating the seat specified by the seat specifying section 201, in the seat position information M.

Thus, by referring to the user information UF associated with one of the pieces of seat identification information SR in the updated seat position information M, it is possible to figure out information about a user seated in a seat indicated by the seat identification information SR.

In the above embodiment, assume that a login user who logs into the complex machine 3 inputs a user seat search instruction containing, as user search information, at least a part of information comprised in the user information UF regarding a specific user. Through this operation, the login user can make a print of an image Z including: the seat identification information SR associated with the user information UF comprising information coincident with the user search information, in the seat position information M; the user information UF associated with the seat identification information SR in the seat position information M; and the status information ST associated with the seat identification information SR in the seat position information M.

Thus, by visually checking the printed image Z, the login user can easily figure out a seated position of the specific user, the user information UF regarding the specific user and whether the specific user is in a seated state or in an unseated state.

In the above embodiment, assume that the image Z including the seat identification information SR, the user identification information UR, the user information UF and the status information ST is printed. In this case, the record management section 303 is operable to store, in the storage unit 35, the record information H comprising: the login user identification information LR as user identification information UR of the login user during the printing operation; the printed seat identification information SR; the printed user identification information UR (the user identification information UR associated with the printed seat identification information SR in the seat position information M); and the printed status information ST, in such a manner as to be associated with each other.

Further, assumes that, after the printing operation, a user seated in a seat indicated by the printed seat identification information SR becomes unseated from the seat. In this case, the seat layout chart update section 202 is operable to change a state indicated by the status information ST associated with the printed seat identification information SR in the seat position information M, from "seated" to "unseated".

As another example, assume that a different user is newly seated in the seat indicated by the printed seat identification information SR. In this case, the seat layout chart update section 202 is operable to change the user identification information UR associated with the printed seat identification information SR in the seat position information M.

Assume that, after printing of the image Z including the seat identification information SR, a user seated in a seat indicated by the printed seat identification information SR becomes unseated from the seat, as mentioned above. In this case, a difference occurs between a combination of the user identification information UR and a state indicated by the status information ST each associated with the seat identification information SR in the seat position information M, and a combination of the user identification information UR and a state indicated by the status information ST each associated with the seat identification information SR in the record information H stored in the storage unit 35 during the printing operation.

In such a situation, the notification section 304 is operable to notify a login user identified by the login user identification information LR associated with the seat identification information SR in the record information H, of the fact that the user seated in the seat indicated by the seat identification information SR printed by the login user becomes unseated from the seat appropriately.

Further, assume that information coincident with user identification information UR received from the moving apparatus 1 is not stored in the second storage section 232, i.e., any user information UF regarding a user identified by the received user identification information UR is not stored in the second storage section 232. In this case, it is impossible to figure out the identity of a user of the terminal device 4 returning the user identification information UR to the moving apparatus 1. However, in the above embodiment, the informing section 203 is operable to store the user identification information UR in the third storage section 233, and inform a given superuser of the fact that an unidentifiable user is present in the seat specified by the seat specifying section 201.

Thus, the superuser receiving the information can promptly take measures to check the identity of the user identified by the user identification information UR, with reference to the user identification information UR stored in the third storage section 233, such as information search for the identity of the user or on-site investigation for the identity of the user.

It should be noted that the above embodiment of the present disclosure has been shown and described simply by way of illustration, and is not intended to limit the present disclosure to the above embodiment. For example, the following modifications may be included within the scope of the disclosure as defined by the appended claims.

(1) As regards each of the moving apparatus 1 and the complex machine 3, the number thereof is not limited to one, but may be two or more. In this case, the system may be configured such that the plurality of moving apparatuses 1 travel, respectively, on a plurality of floors different in altitude. Correspondingly, a plurality of seat layout charts corresponding to the respective floors may be stored in the first storage section 231 of the information sharing server 2. Alternatively, the system may be configured such that the plurality of moving apparatuses 1 travel within one floor along respective different courses to allow a seated state of each user within the floor to be quickly reflected on the seat layout chart.

(2) The seat search section 302 may be configured not to depict the user identification information UR comprises in the search result information, when the seat search section 302 creates an image Z to be printed by the image forming unit 32, in the step S37 (FIG. 12).

(3) The storage unit 23 may be configured such that the storage area thereof is not used as the third storage section 233, and the control unit 20 of the information sharing server 2 may be configured not to operate as the informing section 203. That is, the steps S23, S26 and S27 (FIG. 10) may be omitted. Correspondingly, the seat layout chart update section 202 may be configured to, when, in the step S24, it is unable to acquire any user information UF stored in the second storage section 232 in association with the user identification information UR received in the step S21, return the processing routine to the step S21.

(4) The control unit 30 of the complex machine 3 may be configured not to operate as the record management section 303 and the notification section 304, and correspondingly the control unit 20 of the information sharing server 2 may be configured not to operate as the user information acquisition section 206. That is, the execution of the steps S51 and S52 (FIG. 15) may be omitted.

(5) Assume that, in the step S36 (FIG. 12), the communication unit 22 receives the user seat search instruction transmitted in the step S35 (FIG. 12). In this case, the seat retrieval section 205 may be configured to return, as the search result information, information consisting only of: one of the pieces of seat identification information SR, associated with one of the pieces of user information UF in the seat position information M stored in the first storage section 231, wherein the user information UF comprises information coincident with the user search information contained in the received user seat search instruction; and the seat layout image D.

Correspondingly, the seat search section 302 may be configured to instruct the image forming unit 32 to print an image including only the seat identification information SR comprised in the search result information, in the step S37 (FIG. 12). Specifically, the seat search section 302 may be configured to instruct the image forming unit 32 to print an image depicting a layout position of a seat identified by the seat identification information SR contained in the search result information, in the seat layout image D comprised in the search result information, in such a manner that it is enclosed by a heavy line.

In this modification, assume that a user of the complex machine 3 inputs a user seat search instruction containing, as user search information, at least a part of information comprised in the user information UF regarding a specific user, in the same manner as that described above. In this case, the user of the complex machine 3 can make a print of an image including the seat identification information SR associated with the user information UF comprising information coincident with the user search information.

Thus, by visually checking the printed image, the user of the complex machine 3 can easily figure out a seated position of the specific user.

(6) The seat layout chart may be composed only of the seat position information M, without the seat layout image D. That is, the first storage section 231 stores therein only the seat position information M, without the seat layout image D. Correspondingly, the seat retrieval section 205 may be configured to, when the user seat search instruction transmitted in the step S35 (FIG. 12) is received, return, as the search result information, information devoid of the seat layout image D, to the complex machine 3. Further, instead of creating an image including the seat identification information SR contained in the search result information and others, in the step S37 (FIG. 12), the seat search section 302 may be configured to instruct the image forming unit 32 to print a character string indicative of the seat identification information SR contained in the search result information, etc.

(7) The control unit 30 of the complex machine 3 may be configured not to operate as the seat search section 302, and correspondingly the control unit 20 of the information sharing server 2 may be configured not to operate as the seat retrieval section 205. That is, the execution of the steps S35 and S39 (FIG. 12) may be omitted.

(8) The step S24 (FIG. 10) may be omitted, and the seat layout chart update section 202 may be configured not to associate the user information UF with the seat identification information SR indicative of the seat specified in the step S22, in the step S25 (FIG. 10).

(9) The moving apparatus 1 may be devoid of the human sensor unit 12. Correspondingly, the step S5 (FIG. 9) may be omitted, and the information transmission section 105 may be configured not to transmit the person detection result information, in the step S6 (FIG. 9). Further, the seat layout chart update section 202 may be configured not to associate the status information ST with the seat identification information SR indicative of the seat specified in the step S22, in the step S25 (FIG. 10).

(10) The moving apparatus 1 may be devoid of the directional sensor unit 14, and the control unit 10 of the moving apparatus 1 may be configured not to operate as the direction acquisition section 104. Correspondingly, the step S4 (FIG. 9) may be omitted, and the information transmission section 105 may be configured not to transmit the transmission direction information, in the step S6 (FIG. 9).

In this case, in connection with the step S22 (FIG. 10), the seat specifying section 201 may be configured to specify, as the seat on which the specific terminal device 4 as a replier of the identification information UR received in the step S21 is used, one of the seats which is identified by one of the pieces of the seat identification information SR associated with a set of latitude, longitude and altitude, nearest to a set of latitude, longitude and altitude indicated by the current position information received by the communication unit 22, wherein the set of latitude, longitude and altitude is indicative of the current position of the moving apparatus 1.

In this modification, even in a situation where a plurality of wirelessly communicatable terminal devices 4 are used, respectively, on a plurality of seats within a floor, by using: a set of latitude, longitude and altitude of each seat indicated in the seat position information M; and a current position of the moving apparatus 1 indicated by the current position information acquired by the moving apparatus 1, the seat specifying section 201 can specify one of the seats on which a specific one of the terminal devices 4 returning user identification information UR in response to a wireless signal transmitted from the moving apparatus 1 is used.

Instead of being equipped with the information sharing server relating to the present disclosure and the image forming apparatus relating to the present disclosure separately, the seat management system relating to the present disclosure may be equipped with an apparatus obtained by integrating the information sharing server relating to the present disclosure and the image forming apparatus relating to the present disclosure together. That is, a storage area of the storage unit 35 of the complex machine 3 may be uses as the first storage section 231, the second storage section 232 and the third storage section 233. Further, the control unit 30 of the complex machine 3 may be configured to operate in the same manner as that in the control unit 20 of the information sharing server 2, so as to perform the above processing of various types of information in the control unit 30, instead of transmitting and receiving the various types of information with respect to the communication unit 22 through the communication unit 34.

As described above, the present disclosure makes it possible to figure out a seated position of each user, even in a situation where a plurality of wirelessly communicatable terminal devices are used, respectively, on a plurality of seats within a floor.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A seat management system comprising:
a moving apparatus capable of wirelessly communicating directly with each of a plurality of terminal devices used, respectively, on a plurality of seats being present on a floor, while autonomously moving within the floor; and
an information management apparatus capable of communicating with the moving apparatus,
wherein
the moving apparatus includes:
an information acquisition section operable to transmit a wireless signal requesting a reply of identification information for identifying a user of each of the terminal devices, and acquire the identification information returned from the terminal device;
a position acquisition section operable to acquire a current position of the moving apparatus; and
an information transmission section operable, when the identification information is acquired by the information acquisition section, to transmit the acquired identification information, and the current position acquired by the position acquisition section, to the information management apparatus, and
the information management apparatus includes:
a first storage section storing therein a seat layout chart indicating respective layout positions of the plurality of seats within the floor;
a receiving section operable to receive the identification information and the current position each transmitted by the information transmission section;
a seat specifying section operable, based on the layout positions of the seats indicated in the seat layout chart, and the current position received by the receiving section, to specify one of the seats on which a specific one of the terminal devices as a replier of the identification information received by the receiving section is used; and
a seat layout chart update section operable to add the identification information received by the receiving section to the seat specified by the seat specifying section, in the seat layout chart stored in the first storage section, to thereby update the seat layout chart.

2. The seat management system of claim 1, wherein the moving apparatus further includes a direction acquisition section operable to acquire a transmission direction of the wireless signal transmitted by the information acquisition section, and wherein:
the information transmission section is operable, when the identification information is acquired by the information acquisition section, to additionally transmit the transmission direction acquired by the direction acquisition section, to the information management apparatus;
the receiving section is operable to additionally receive the transmission direction transmitted by the information transmission section; and
the seat specifying section is operable to specify, as the seat on which the specific terminal device as a replier of the identification information received by the receiving section is used, one of the seats which is laid out in the seat layout chart at a nearest position from the current position received by the receiving section, in a direction indicated by the transmission direction received by the receiving section.

3. The seat management system of claim 1, wherein the moving apparatus further includes a person detection unit configured to detect whether a person is present or absent within a given distance from the moving apparatus, and wherein:
the information transmission section is operable, when the identification information is acquired by the information acquisition section, to additionally transmit a result of the detection by the person detection unit, to the information management apparatus;
the receiving section is operable to additionally receive the detection result transmitted by the information transmission section; and
the seat layout chart update section is operable, when the detection result received by the receiving section indicates the presence of a person, to additionally add, as status information, information indicative of a seated state, and, when the detection result indicates the absence of a person, to additionally add, as the status information, information indicative of an unseated state.

4. The seat management system of claim 1, wherein the information management apparatus further includes a second storage section which stores therein a plurality of pieces of identification information, and a plurality of pieces of user information about respective users identifiable by the plurality of pieces of identification information, in such a manner as to be associated with each other, and wherein the seat layout chart update section is operable to additionally add one of the pieces of user information stored in the second storage section in association with the identification information received by the receiving section.

5. The seat management system of claim 4, which further comprises an image forming apparatus, wherein each piece of user information comprises attribute information about a user associated with each piece of user information, the attribute information being composed of one or more attribute elements, and wherein
the image forming apparatus includes:
an image forming unit configured to perform a printing operation; and
a seat search section operable to accept an input of attribute information composed of at least a part of the attribute elements comprised in a specific one of the pieces of user information, regarding a specific user, and instruct the image forming unit to print seat information indicative of a specific one of the seats to which the specific user information comprising information coincident with the accepted attribute information is added in the seat layout chart stored in the first storage section.

6. The seat management system of claim 4, which further comprises an image forming apparatus, wherein the moving apparatus further includes a person detection unit configured to detect whether a person is present or absent within a given distance from the moving apparatus, and wherein:

the information transmission section is operable, when the identification information is acquired by the information acquisition section, to additionally transmit a result of the detection by the person detection unit, to the information management apparatus;

the receiving section is operable to additionally receive the detection result transmitted by the information transmission section;

the seat layout chart update section is operable, when the detection result received by the receiving section indicates the presence of a person, to additionally add, as status information, information indicative of a seated state, and, when the detection result indicates the absence of a person, to additionally add, as the status information, information indicative of an unseated state; and each piece of user information comprises attribute information about a user associated with each piece of user information, the attribute information being composed of one or more attribute elements, and wherein the image forming apparatus includes:
   an image forming unit configured to perform a printing operation; and
   a seat search section operable to accept an input of attribute information composed of at least a part of the attribute elements comprised in a specific one of the pieces of user information, regarding a specific user, and instruct the image forming unit to print seat information indicative of a specific one of the seats to which the specific user information comprising information coincident with the accepted attribute information is added in the seat layout chart stored in the first storage section; the specific user information added to the specific seat; and the status information added to the specific seat.

7. The seat management system of claim 6, wherein the image forming apparatus further includes:
   a storage unit;
   a record management section operable, when the seat information, the specific user information and the status information are printed by the image forming unit, to store, in the storage unit, a user of the image forming apparatus during the printing operation, the specific seat indicated by the printed seat information, the identification information added to the specific seat in the seat layout chart stored in the first storage section, and the printed status information, in such a manner as to be associated with each other; and
   a notification section operable, when, regarding any one of the seats, there is a difference between a combination of the identification information and a state indicated by the status information each added in the seat layout chart stored in the first storage section and a combination of the identification information and a state indicated by the status information each stored in the storage unit in association with each other, to notify a user of the image forming apparatus stored in the storage unit in association with the seat, of a fact that a user seated in the seat becomes unseated from the seat.

8. The seat management system of claim 4, wherein the information management apparatus further includes:
   a third storage section; and
   an informing section operable, when information coincident with the identification information received by the receiving section is not stored in the second storage section, to store the received identification information in the third storage section, and inform a given superuser of a fact that an unidentifiable user is present in the seat specified by the seat specifying section.

* * * * *